(12) United States Patent
Davis, II

(10) Patent No.: US 12,430,848 B2
(45) Date of Patent: Sep. 30, 2025

(54) SYSTEM AND METHOD FOR ENERGY INFRASTRUCTURE AND GEOSPATIAL DATA VISUALIZATION, MANAGEMENT, AND ANALYSIS USING ENVIRONMENT SIMULATION AND VIRTUAL REALIZATION

(71) Applicant: Energybill.com LLC, Lockhart, TX (US)

(72) Inventor: Michael Andrew Davis, II, Lockhart, TX (US)

( * ) Notice: Subject to any disclaimer, the term of this patent is extended or adjusted under 35 U.S.C. 154(b) by 0 days.

(21) Appl. No.: 18/437,492

(22) Filed: Feb. 9, 2024

(65) Prior Publication Data

US 2024/0273819 A1 Aug. 15, 2024

Related U.S. Application Data

(63) Continuation-in-part of application No. 17/512,447, filed on Oct. 27, 2021.
(Continued)

(51) Int. Cl.
*G06T 17/00* (2006.01)
*G01S 17/89* (2020.01)
(Continued)

(52) U.S. Cl.
CPC .............. *G06T 17/00* (2013.01); *G01S 17/89* (2013.01); *G06V 10/44* (2022.01); *G06V 10/764* (2022.01)

(58) Field of Classification Search
CPC ......... G06T 17/00; G06T 19/00; G06T 19/20; G06V 10/44; G06V 10/764; G01S 17/89
(Continued)

(56) References Cited

U.S. PATENT DOCUMENTS

| 9,990,769 B2 | 6/2018 | Arsan et al. |
| 10,369,472 B1 | 8/2019 | Mattar et al. |

(Continued)

FOREIGN PATENT DOCUMENTS

| CN | 101763455 A | * | 6/2010 |
| CN | 102411105 A | * | 4/2012 |

(Continued)

OTHER PUBLICATIONS

"Automatic Inspection Drone with Deep Learning-based Auto-tracking Camera Gimbal to Detect Defects in Power Lines", Joon-Young Park et al., ACM 2019.*

(Continued)

*Primary Examiner* — Charles Tseng

(57) ABSTRACT

A computer-implemented method for automated damage assessment of electric grid infrastructure for post-storm recovery includes a virtual model system including a three-dimensional (3D) virtual model of physical grid infrastructure with assets, using a lidar imaging data point cloud collected in the field to characterize the physical asset condition, performing a simulation algorithm including a damage simulation and a lidar imaging data simulation, and executing a trained classifier to identify the damaged or undamaged condition of the asset using the field collected lidar imaging data point cloud, where the classifier is trained with simulated collected lidar imaging data of undamaged and damaged assets.

19 Claims, 34 Drawing Sheets
(25 of 34 Drawing Sheet(s) Filed in Color)

Related U.S. Application Data

(60) Provisional application No. 63/484,479, filed on Feb. 10, 2023, provisional application No. 63/106,119, filed on Oct. 27, 2020.

(51) Int. Cl.
 *G06V 10/44* (2022.01)
 *G06V 10/764* (2022.01)

(58) Field of Classification Search
 USPC .......................................................... 345/419
 See application file for complete search history.

(56) References Cited

U.S. PATENT DOCUMENTS

| | | |
|---|---|---|
| 11,107,162 B1 | 8/2021 | Nussbaum et al. |
| 2008/0143727 A1 | 6/2008 | Oh et al. |
| 2010/0179800 A1 | 7/2010 | Nam et al. |
| 2011/0106321 A1 | 5/2011 | Cherian et al. |
| 2015/0006141 A1 | 1/2015 | Enenkel et al. |
| 2018/0144558 A1* | 5/2018 | Priest .................. G06F 16/9537 |
| 2019/0197770 A1* | 6/2019 | Chang .................. G06V 30/144 |
| 2020/0041560 A1* | 2/2020 | Schwartz ............. G01R 31/086 |
| 2020/0293032 A1 | 9/2020 | Wang et al. |
| 2021/0407187 A1* | 12/2021 | Gupta ..................... G01S 17/89 |
| 2022/0204019 A1* | 6/2022 | Lauterbach ........... G06T 15/205 |
| 2022/0307234 A1* | 9/2022 | Hillier .................. G06V 10/143 |

FOREIGN PATENT DOCUMENTS

| | | |
|---|---|---|
| CN | 102426305 A * | 4/2012 |
| CN | 106528608 A1 | 3/2017 |

OTHER PUBLICATIONS

"Field Damage Assessments as a Design Tool for Information and Communications Technology Systems that are Resilient to Natural Disasters", Alexis Kwasinski et al., Isabel '11, Oct. 26-29, Barcelona, Spain, 2011 ACM.*

* cited by examiner

101

-15deg, lean to "left"    0deg, no lean    +30deg, lean to "right"

FIG. 26    600

SYSTEM AND METHOD FOR ENERGY INFRASTRUCTURE AND GEOSPATIAL DATA VISUALIZATION, MANAGEMENT, AND ANALYSIS USING ENVIRONMENT SIMULATION AND VIRTUAL REALIZATION

CROSS-REFERENCE TO RELATED APPLICATIONS

This application is related and claims priority to U.S. Provisional Application 63/484,479 filed Feb. 10, 2023 and titled "System and Method for Energy Infrastructure and Geospatial Data Visualization, Management, and Analysis Using Environment Simulation and Virtual Realization"; U.S. Provisional Application 63/106,119 filed Oct. 27, 2020 and titled "System and Method for Energy Infrastructure and Geospatial Data Visualization, Management, and Analysis Using Environment Simulation and Virtual Realization"; and U.S. Non-provisional application Ser. No. 17/512,447 filed Oct. 27, 2021 and titled "System and Method for Energy Infrastructure and Geospatial Data Visualization, Management, and Analysis Using Environment Simulation and Virtual Realization"; each of these related applications being incorporated by reference in entirety.

FIELD OF THE INVENTION

The disclosure generally relates to systems, apparatus and methods for electrical power grid operation, maintenance, repair, resiliency, and post-storm recovery. More particularly, the disclosure relates to systems, apparatus, and methods for expedited automated damage assessment of electrical power grid infrastructure for post-storm recovery.

BACKGROUND OF THE INVENTION

In the context of electric utility power grid ("grid") infrastructure for distribution of electricity, resiliency is the capability to maintain optimal grid performance during system disruptions and recover quickly from such system disruptions. Many external factors influence how utilities address the resiliency of the grid, including severe weather, cyberattacks, terrorism, theft, electromagnetic impulses, vandalism and supply chain disruptions. Weather remains the single greatest threat to the electric power grid, and the impacts caused by significant storms can be long-lasting and widespread.

When the grid is damaged due to significant storms, it is very costly for the utility operator to identify particular failure locations due to the vast size of electrical transmission and distribution circuits, which can span hundreds of miles. Pinpointing a failure in a circuit requires the expensive process of dispatching human teams to "walk the line" and physically inspect the circuit to identify damage.

The above-referenced problems are exemplified by damage to grid infrastructure in Texas caused by hurricane Harvey in 2017. Harvey made landfall on Aug. 26, 2017 on the southern coast of Texas. Over the next several days the storm battered the region, including Houston, with heavy rains, wind, and flooding. According to the National Hurricane Center (NHC), over 336,000 customers, or meters, serving millions of people, lost power during the storm. American Electric Power (AEP), for example, is one of the many transmission and distribution utilities (TDU) that services the state, representing about a million of the ten million meters in the state.

AEP reported about $415 million in costs to recover from Harvey-related damages to their transmission and distribution (T&D) infrastructure. Not well reported, however, is what these costs represent. Most of these costs were labor-related. This included the hourly time costs of the necessary skilled labor, the engineers, electricians, and linemen, as well as their lodging, travel, tools and equipment, repair trucks, and so on. In the midst of hurricane Harvey, AEP called in about 5,600 additional workers from all over the country, paid on contract, and had crews of personnel working around the clock in 14 to 16 hour shifts, to restore power and begin restoration efforts which would last months and years.

It is very difficult to inspect T&D infrastructure. Even when it is known that there is an outage in a certain region, for example a specific circuit is down, the cause of the outage may be concealed within miles of power line, potentially dozens if not hundreds of miles worth. Currently, the only practical way to locate damage is visually, by having teams of humans "walk the line" so to speak. This entails literally driving around, walking around, or in the case of Harvey even boating around, looking for damage.

While monitoring and control technology exist, such technology is expensive, rarely deployed, and not very useful in scenarios that involve physical damage or multiple points of damage to a widely distributed grid from a significant storm. If a circuit goes down, for example, a monitoring system might be able to direct repair personnel to the first point of failure. After the circuit is de-energized, however, monitoring equipment will go offline with the circuit. Bringing the circuit back online may require replacing many pieces of hardware, in multiple locations. Even advanced monitoring equipment will not locate, identify or inform the utility grid operator that these many pieces of hardware in multiple locations have failed or suffered damage and must be repaired or replaced.

Complicating the matter further, the aforementioned problems also exist for finding damage, and safety hazards, in the absence of an outage. After a storm, infrastructure needs to be inspected even if power is online. There are many potential scenarios. For example, distribution poles could be leaning while the attached conductors are live and still delivering power. Lines could be low or touching the ground. Infrastructure could have sustained damage and be on the verge of causing a system failure, and/or present immediate life health safety hazards. The only way for the utility company to know whether particular infrastructure is damaged and/or presents immediate hazards, is by inspecting all of the infrastructure in the service area subjected to the storm.

AEP alone has about 43,000 miles worth of distribution line in Texas. CenterPoint Energy, another TDU in Texas, has about 50,000 miles. Statewide there are hundreds of thousands of miles worth of distribution line. It is not feasible to visually inspect all of this infrastructure each time there is a severe weather event. Even when damage is known to exist due to an outage, the need to visually inspect to determine scope of such dramatically increases resiliency costs and time to recover to normal or optimal grid performance. There is a need for improved systems, apparatus and methods for electrical power grid inspection, resiliency and post-storm recovery. There is need for improved systems, apparatus, and methods for automated damage assessment and virtual inspection of electrical power grid infrastructure for post-storm recovery.

BRIEF SUMMARY OF THE INVENTION

The above-mentioned shortcomings, disadvantages and problems are addressed herein, as will be understood by those skilled in the art upon reading and studying the following specification. This summary is provided to introduce a selection of concepts in simplified form that are further described below in more detail in the Detailed Description. This summary is not intended to identify key or essential features of the claimed subject matter.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Light Detection and Ranging ("LIDAR" or "lidar") systems are a mature technology that performs geospatial three-dimensional scans. Lidar systems include an active remote sensor of a laser pulse reflection that operates in the visible or near-visible part of the electromagnetic spectrum to obtain spatial measurements. Lidar technology is a portmanteau of light and conventional radar, used by scientists since the 1960s, with its first applications in meteorology for measuring clouds and pollution. The basic operation of lidar is that light pulses are transmitted, and then reflections are captured. The travel time, divided by speed of light, then determines distance. Lidar operates with a relatively short wavelength and enables collection of distance data at high resolution.

Current technology is, however, incapable of managing the volume of lidar data collected from flight vehicles flying along known power line routes, such as power line routes extending many miles. Extensive human and computing resources and time must be devoted to handling and post-processing of raw lidar data before reviewing can be performed. Reviewing post-processed lidar data is a further unduly tedious, manual process that requires skilled, trained personnel to perform vast amounts of review efforts requiring many hours. Existing visualization software is limited and can only process small portions of the lidar data at any time.

According to the present disclosure, flight vehicles may fly along known power line routes may quickly collect lidar scan data ("lidar data") of grid infrastructure, and automated visualization of the collected lidar data may enable remote observation and inspection of the grid infrastructure in a virtual model system including geographic information and network topology information. In an embodiment, semi-automated inspection of the grid infrastructure may be performed by a computing device configured to perform an automated inspection algorithm and provide the inspection algorithm output to a visual display for viewing by a user. In an embodiment, fully automated inspection of the grid infrastructure may be performed by a computing device configured to perform such an automated inspection algorithm and provide an automated inspection classification with the inspection algorithm output. In an embodiment, an automated inspection algorithm may be a trained machine learning algorithm or artificial intelligence algorithm. Such machine learning algorithm or artificial intelligence algorithm may be trained, for example, by reference to a plurality of correlated lidar data sets and grid infrastructure.

In an embodiment, automated damage assessment of grid infrastructure, such as T&D infrastructure, may be performed by a computer-implemented system including a processor operable to execute an automated damage assessment algorithm with lidar data collected in the field and a virtual model system of the grid infrastructure in entirety. Such a virtual model system may include integrated physical grid data from a plurality of sources. The plurality of physical grid data sources may include geographic information of the physical grid infrastructure and network topology information of the physical grid infrastructure. The virtual model system may include a three-dimensional (3D) virtual model of the physical grid infrastructure generated from the integrated physical grid data.

In an embodiment, for example as described in the preceding paragraph, a computer-implemented system to perform an automated damage assessment algorithm may include a processor operable to perform a simulation algorithm with the virtual model system. In an embodiment, the simulation algorithm may include a damage simulation and an imaging data simulation, such as a lidar imaging data simulation. In an embodiment, the damage simulation may include an asset condition module to simulate undamaged condition of an asset in an undamaged condition mode or damaged condition of an asset in a damaged condition mode. The lidar imaging data simulation may further include, for example, a simulated lidar data point cloud for a virtual asset model corresponding to a physical asset. The lidar imaging data simulation may further include a flight vehicle simulation executable by a processor to simulate any of the following: lidar sensor travel as carried on the simulated flight vehicle, lidar sensor attitude in relation to the simulated flight vehicle, lidar sensor attitude in relation to the simulated grid infrastructure as carried on the simulated flight vehicle, and particular data collection properties of the lidar sensor.

In an embodiment, for example as described in the preceding paragraphs, the computer-implemented system with processor may include the asset condition module to perform simulation of asset condition with the virtual model system of the grid infrastructure. In an embodiment, the asset condition module may be configurable to simulate undamaged condition of an asset in an undamaged condition mode or simulate damaged condition of an asset in a damaged condition mode. The asset condition module in the damaged condition mode may determine simulated damage including any of the following:
(i) simulated damage generated by automated manipulation of a virtual asset model generated programmatically;
(ii) simulated damage generated by manual manipulation of grouped points in a lidar data point cloud, where the lidar data point cloud includes real lidar data collected from imaging the physical asset in the field;
(iii) simulated damage generated by manual manipulation of grouped points in a lidar data point cloud, where the lidar data point cloud includes simulated lidar data created by simulated imaging of the virtual asset model in the virtual model system;
(iv) simulated damage generated by automated manipulations of grouped points in a lidar data point cloud, where the grouped points are automatically selected and grouped, and where the lidar data point cloud includes real lidar data collected from imaging the physical asset in the field;
(v) simulated damage generated by automated manipulations of grouped points in a lidar data point cloud, where the grouped points are automatically selected and grouped, and where the lidar data point cloud includes simulated lidar data created by simulated imaging of the virtual asset model in the virtual model system;

(vi) simulated damage generated by manual creation of a fixed virtual asset model, where the fixed virtual asset model embodies selected hypothetical damage of a particular physical asset represented by the virtual asset model; and (vii) simulated damage generated by automated manipulation of a virtual asset model in predetermined ways, where the virtual asset model in three-dimensions includes keyframe animations allowing manipulation of the virtual asset model in the predetermined ways.

In an embodiment, for example as described in the preceding paragraphs, the computer-implemented system with processor may include the lidar imaging data simulation, wherein simulated lidar imaging data is generated by simulating collection of lidar imaging data by a lidar sensor carried on a flight vehicle, and wherein travel of the flight vehicle along the grid infrastructure is generated by simulated travel of a virtual model flight vehicle, carrying the lidar sensor, in relation to the virtual model system of the grid infrastructure.

In an embodiment, for example as described in the preceding paragraphs, a computer-implemented system with a processor to perform automated damage assessment by executing an automated damage assessment algorithm may include a classifier to use field collected lidar imaging data of assets to perform identifying of damaged assets and undamaged assets. Following a storm that may damage grid infrastructure, the field collected lidar imaging data of assets may be collected by a lidar sensor carried on a flight vehicle surveying or traversing the grid infrastructure in entirety. In an embodiment, the post-storm field collected lidar imaging data of assets may be processed to extract features from the raw field collected lidar imaging data to enable identification of assets by locations, such as locations determined from GPS data collected during the post-storm flight to perform the field collection of lidar imaging data of physical assets. The classifier may include a trained classification model to receive and use the post-storm field collected lidar imaging data of assets to perform identifying of damaged assets and undamaged assets. In an embodiment, the trained classification model may access or include a machine learning algorithm. In an embodiment, the trained classification model may access or include an artificial intelligence algorithm. The classification model may be trained by processing field collected lidar imaging data of a plurality of assets, simulated collected lidar imaging data of a plurality of assets, or both, wherein the plurality of assets includes both damaged assets and undamaged assets, with the condition of same being identified for training the classification model.

Apparatus, systems, and methods of varying scope are described herein. These aspects are indicative of various non-limiting ways in which the disclosed subject matter may be utilized, all of which are intended to be within the scope of the disclosed subject matter. In addition to the aspects and advantages described in this summary, further aspects, features, and advantages will become apparent by reference to the associated drawings, detailed description, and claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The novel features believed characteristic of the disclosed subject matter will be set forth in any claims that are filed later. The disclosed subject matter itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF THE INVENTION

Figure 1A:
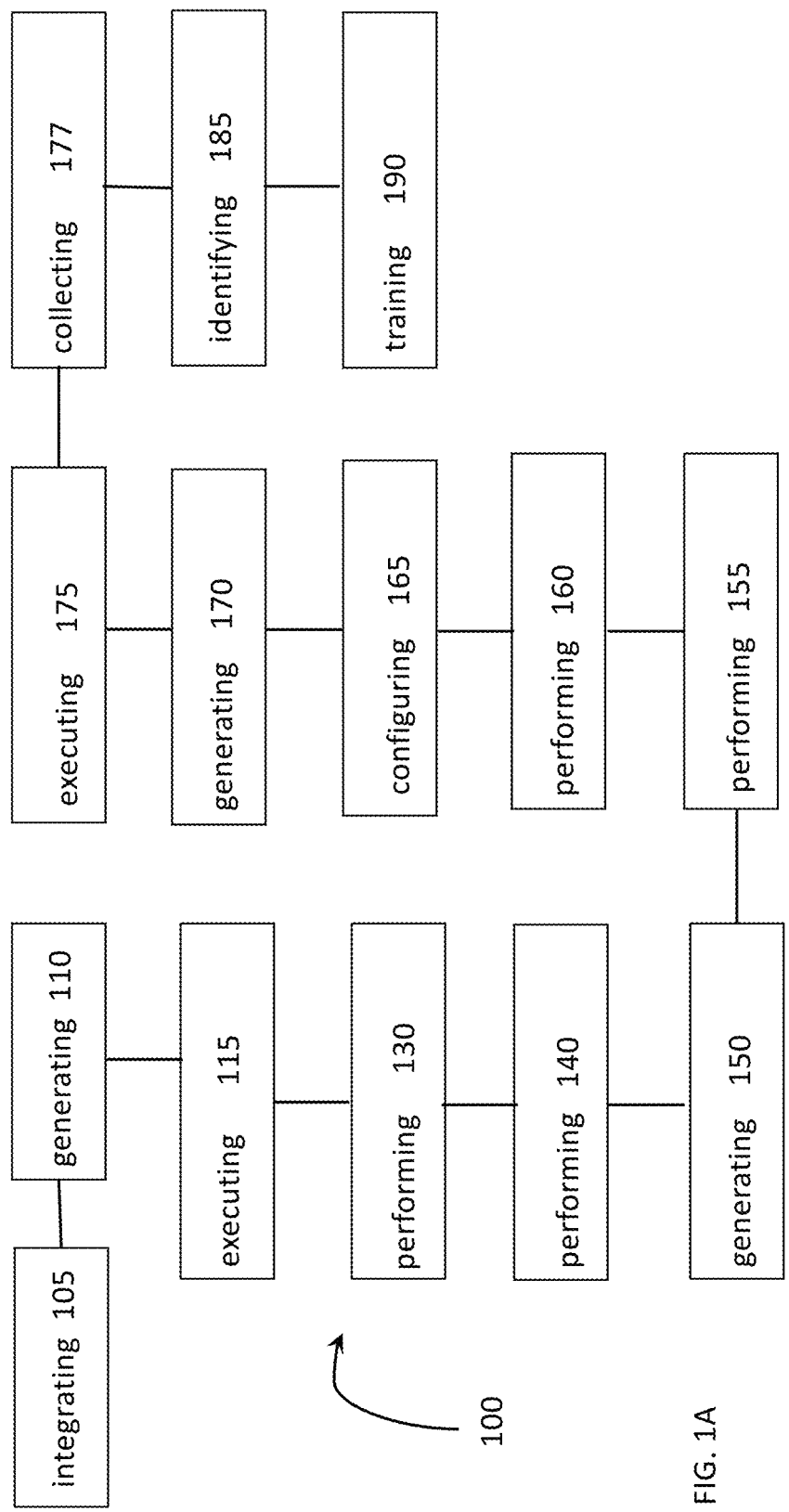
FIG. 1A is a simplified schematic view of a flow diagram illustrating a method for automated damage assessment of grid infrastructure, in an exemplary embodiment.

In this detailed description, reference is made to the accompanying drawings which form a part hereof, and in which is shown by way of illustration specific embodiments which may be practiced. Reference now should be made to the drawings, in which the same reference numbers are used throughout the different figures to designate the same components. These embodiments are described in sufficient detail to enable those skilled in the art to practice the embodiments and disclosure. It is to be understood that other embodiments may be utilized, and that logical, mechanical, electrical, and other changes may be made without departing from the scope of the embodiments and disclosure. In view of the foregoing, the following detailed description is not to be taken as limiting the scope of the embodiments or disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be appreciated that for simplicity and clarity of illustration, where considered appropriate, reference numerals may be repeated among the figures to indicate corresponding or analogous elements. In addition, numerous specific details are set forth in order to provide a thorough understanding of the implementations described herein. However, it will be understood by those of ordinary skill in the art that the implementations described herein may be practiced without these specific details. In other instances, well-known methods, procedures and components have not been described in detail so as not to obscure the implementations described herein. Also, the description is not to be considered as limiting the scope of the implementations described herein.

The detailed description set forth herein in connection with the appended drawings is intended as a description of exemplary embodiments in which the presently disclosed apparatus and system can be practiced. The term "exemplary" used throughout this description means "serving as an example, instance, or illustration," and should not necessarily be construed as preferred or advantageous over other embodiments.

The following illustrates the principles of the invention. It will be appreciated that those skilled in the art will be able to devise various arrangements which, although not explicitly described or shown herein, embody the principles of the invention and may be included in the spirit and scope.

The text Understanding Virtual Reality (Second Edition), Sherman W. and Craig A. (Elsevier Inc. 2018) is incorporated by reference in entirety. The text Networked Graphics Building Networked Games and Virtual Environments (First Edition), Steed A. and Oliveira M. F. (Morgan Kaufmann 2009) is incorporated by reference in entirety. The text Developing Virtual Reality Applications, Craig A., Sherman W. and Will J. (Elsevier 2009) is incorporated by reference in entirety. The text Electric Power Distribution Engineering (3rd Edition), Gonen T. (CRC Press 2014) is incorporated by reference in entirety.

Figure 1B:
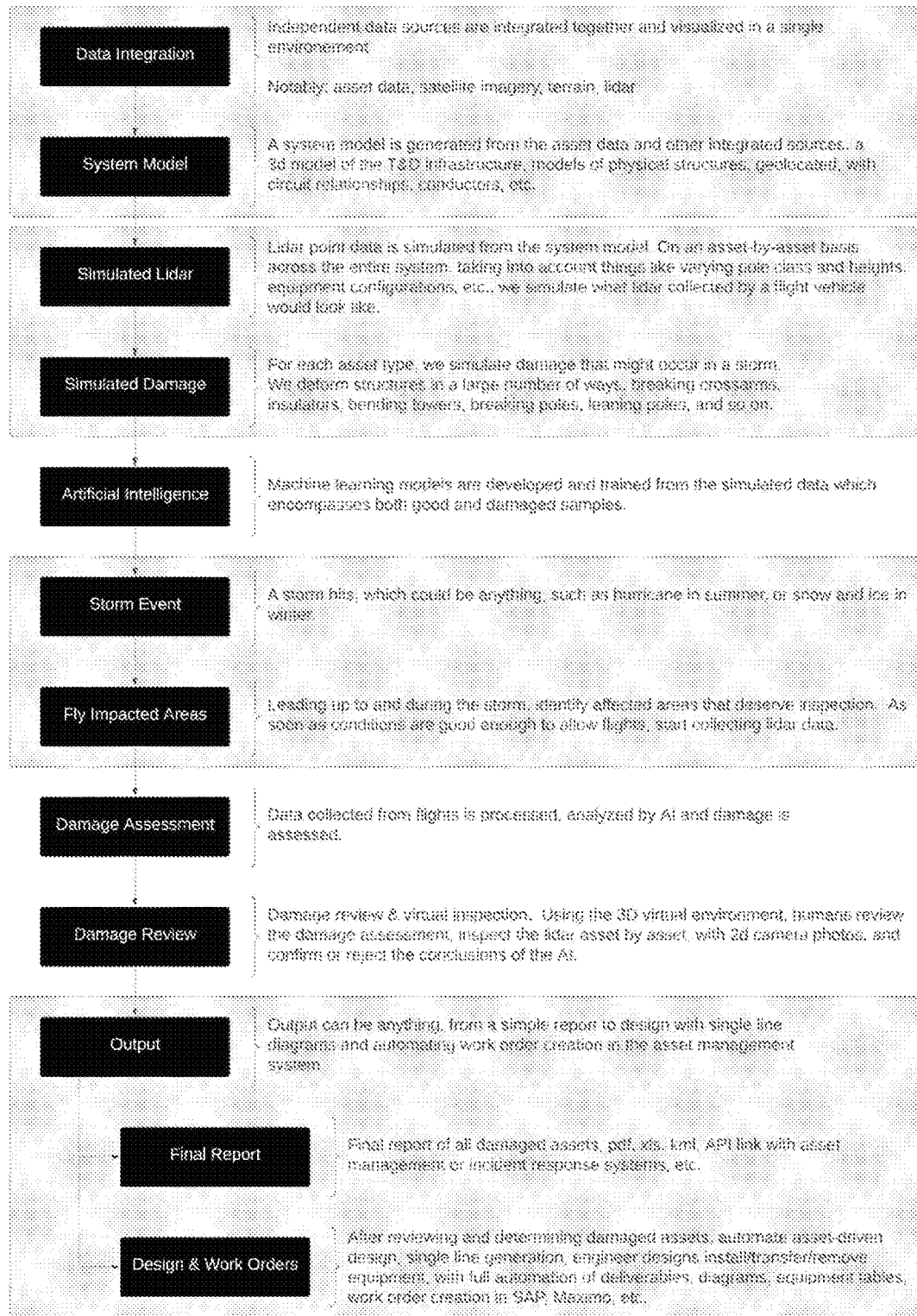
FIG. 1B is an informal simplified schematic view of a flow diagram illustrating aspects of a method, similar to the method shown in FIG. 1A, for automated damage assessment of grid infrastructure, in an exemplary embodiment.

FIG. 1A is a simplified schematic diagram illustrating a method 100 for automated damage assessment of grid infrastructure, in an exemplary embodiment. Except as otherwise described or illustrated, or otherwise suggested by context herein, method 100 for automated damage assessment of grid infrastructure may be similar to the exemplary method (also, 100) for managing an electric utility power transmission and distribution grid, which is disclosed in related U.S. Non-provisional application Ser. No. 17/512,447 filed Oct. 27, 2021, which is incorporated by reference. The grid infrastructure may include a plurality of utility assets ("assets") distributed on a utility power line route in a geographic area and has a configuration suitable for transmission and distribution (T&D) of electricity. FIG. 1B is an informal diagram illustrating aspects of a method 101, similar to method 100, for automated damage assessment.

Referring to FIG. 1A, in an embodiment, method 100 for automated damage assessment of grid infrastructure, such as T&D infrastructure, may be performed by a computer-implemented system including a processor operable to execute an automated damage assessment algorithm with lidar data collected in the field and a virtual model system of the grid infrastructure in entirety. Method 100 may include integrating 105 physical grid data from a plurality of sources to provide integrated physical grid data from the plurality of sources. Method 100 for automated damage assessment may include generating 110 the virtual model system using the integrated physical grid data from a plurality of sources. The plurality of physical grid data sources may include geographic information of the physical grid infrastructure and network topology information of the physical grid infrastructure. The virtual model system may include a three-dimensional (3D) virtual model of the physical grid infrastructure generated by integrating 105 the integrated physical grid data from disparate sources.

In an embodiment, as shown in FIG. 1A, a computer-implemented method 100 may include performing an automated damage assessment algorithm. Such performing may further include executing 115 a simulation algorithm using the virtual model system to perform the various simulations as herein described. In an embodiment, the simulation algorithm may include a damage simulation and an imaging data simulation, such as a lidar imaging data simulation. In an embodiment, method 100 may further include performing 130 the damage simulation. In an embodiment, method 100 may include performing 140 an asset condition module to simulate undamaged condition of an asset in an undamaged condition mode or damaged condition of an asset in a damaged condition mode. Performing the lidar imaging data simulation may further include, for example, generating 150 a simulated lidar data point cloud for a virtual asset model corresponding to a physical asset. The lidar imaging data simulation may further include performing 155 a flight vehicle simulation executable by a processor to simulate any of the following: lidar sensor travel as carried on the simulated flight vehicle, lidar sensor attitude in relation to the simulated flight vehicle, lidar sensor attitude in relation to the simulated grid infrastructure as carried on the simulated flight vehicle, and particular data collection properties of the lidar sensor.

In an embodiment, as shown in FIG. 1A, computer-implemented method 100 for automated damage assessment may further include performing 160 the executable asset condition module to simulate asset condition with the virtual model system 110 of the grid infrastructure. In an embodiment, performing 160 the executable asset condition module may further include configuring 165 the module to simulate undamaged condition of an asset in an undamaged condition mode or damaged condition of an asset in a damaged condition mode. In an embodiment, the asset condition module in the damaged condition mode may determine simulated damage including any of the following:

(i) simulated damage generated by automated manipulation of a virtual asset model generated programmatically;

(ii) simulated damage generated by manual manipulation of grouped points in a lidar data point cloud, where the lidar data point cloud includes real lidar data collected from imaging the physical asset in the field;

(iii) simulated damage generated by manual manipulation of grouped points in a lidar data point cloud, where the lidar data point cloud includes simulated lidar data created by simulated imaging of the virtual asset model in the virtual model system;

(iv) simulated damage generated by automated manipulations of grouped points in a lidar data point cloud, where the grouped points are automatically selected and grouped, and where the lidar data point cloud includes real lidar data collected from imaging the physical asset in the field;

(v) simulated damage generated by automated manipulations of grouped points in a lidar data point cloud, where the grouped points are automatically selected and grouped, and where the lidar data point cloud includes simulated lidar data created by simulated imaging of the virtual asset model in the virtual model system;

(vi) simulated damage generated by manual creation of a fixed virtual asset model, where the fixed virtual asset model embodies selected hypothetical damage of a particular physical asset represented by the virtual asset model; and (vii) simulated damage generated by automated manipulation of a virtual asset model in predetermined ways, where the virtual asset model in three-dimensions includes keyframe animations allowing manipulation of the virtual asset model in the predetermined ways.

In an embodiment, as shown for example in FIG. 1A, in the computer-implemented method 100 for automated damage assessment, the simulation algorithm may include generating 170 a simulated collected lidar imaging data point cloud by performing the executable lidar imaging data simulation, wherein one of the simulated collected lidar imaging data point clouds corresponds to each asset and may be determined by GPS data. In an embodiment, the lidar imaging data simulation may perform the generating 170 by simulating the collection of lidar imaging data by a lidar sensor carried on a flight vehicle to travel along the grid infrastructure. In an embodiment, generating 170 may include simulated travel of a virtual model flight vehicle to carry a simulated lidar sensor along the grid infrastructure to image the plurality of virtual model assets in the virtual model system of the grid infrastructure.

In an embodiment, as shown for example in FIG. 1A, the computer-implemented method 100 for automated damage assessment may include executing 175 a trained classifier of the automated damage assessment algorithm. Executing 175 the trained classifier may use field collected lidar imaging data of assets to perform identifying 185 of damaged assets and undamaged assets. Method 100 may include collecting 177 field collected lidar imaging data of physical assets in the physical field. Such collecting 177 may include, following a storm that may damage grid infrastructure, the field collected lidar imaging data of physical assets may be collected in the physical field as opposed to the virtual model system, by a physical lidar sensor carried on a physical flight vehicle surveying or traversing the physical grid infrastructure in entirety. In an embodiment, the post-storm field collected lidar imaging data of assets may be processed to extract features from the raw field collected lidar imaging data to enable identification of assets by locations, such as locations determined from GPS data collected during the post-storm flight to perform the field collection of lidar imaging data of physical assets. The trained classifier may include a trained classification model to receive and use the post-storm field collected lidar imaging data of assets to perform identifying 185 of damaged assets and undamaged assets. In an embodiment, the trained classification model may access or include a machine learning algorithm. In an embodiment, the trained classification model may access or include an artificial intelligence algorithm. In an embodiment, method 100 may include training 190 the classification model. The classification model may be trained by processing field collected lidar imaging data of a plurality of assets, simulated collected lidar imaging data of a plurality of assets, or both, wherein the plurality of assets includes both damaged assets and undamaged assets, with the condition of same being identified for training the classification model.

Figure 2A:
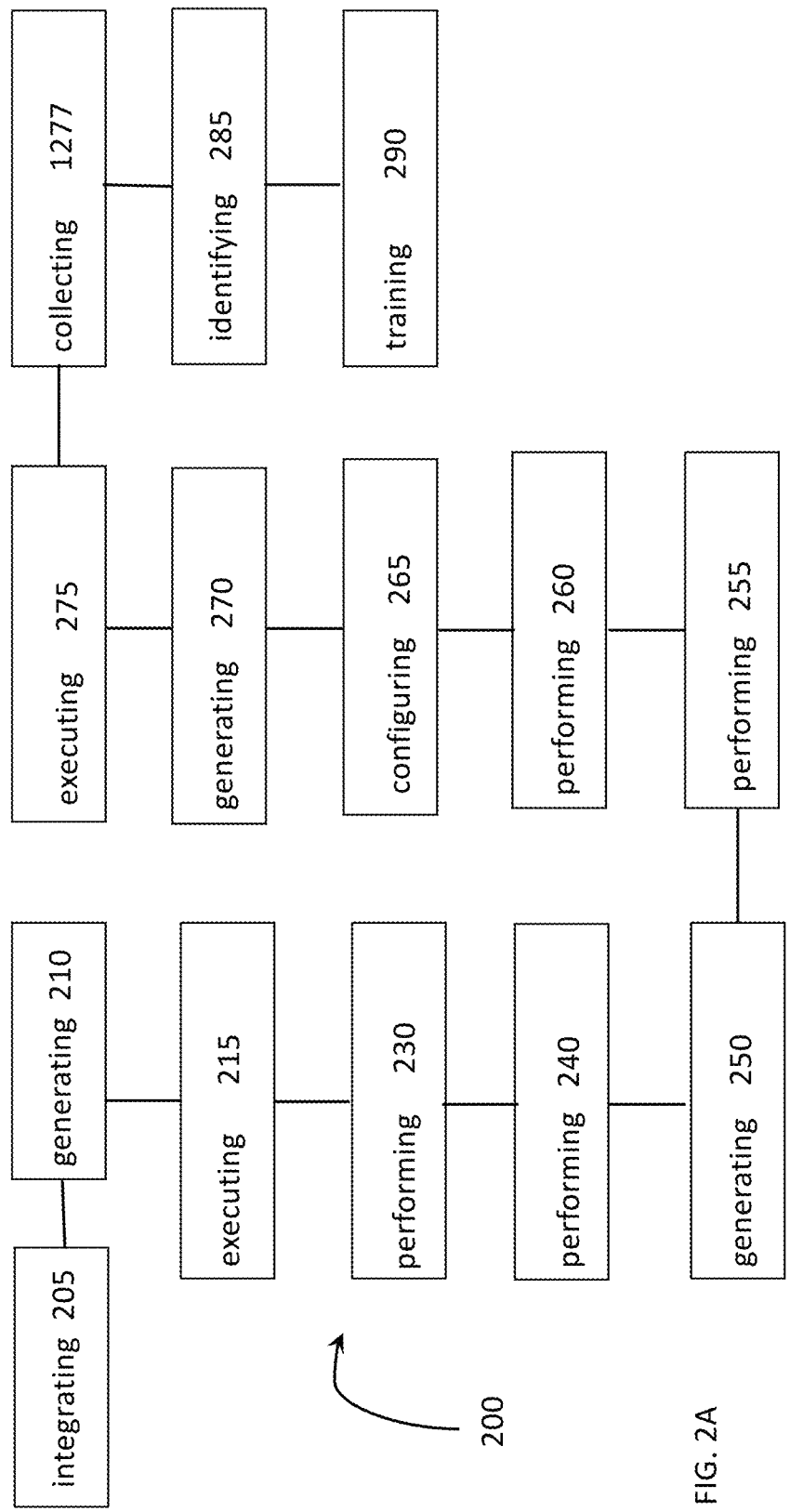
FIG. 2A is a simplified schematic view of a flow diagram illustrating a method for automated damage assessment of grid infrastructure, in an exemplary embodiment.
Figure 2B:
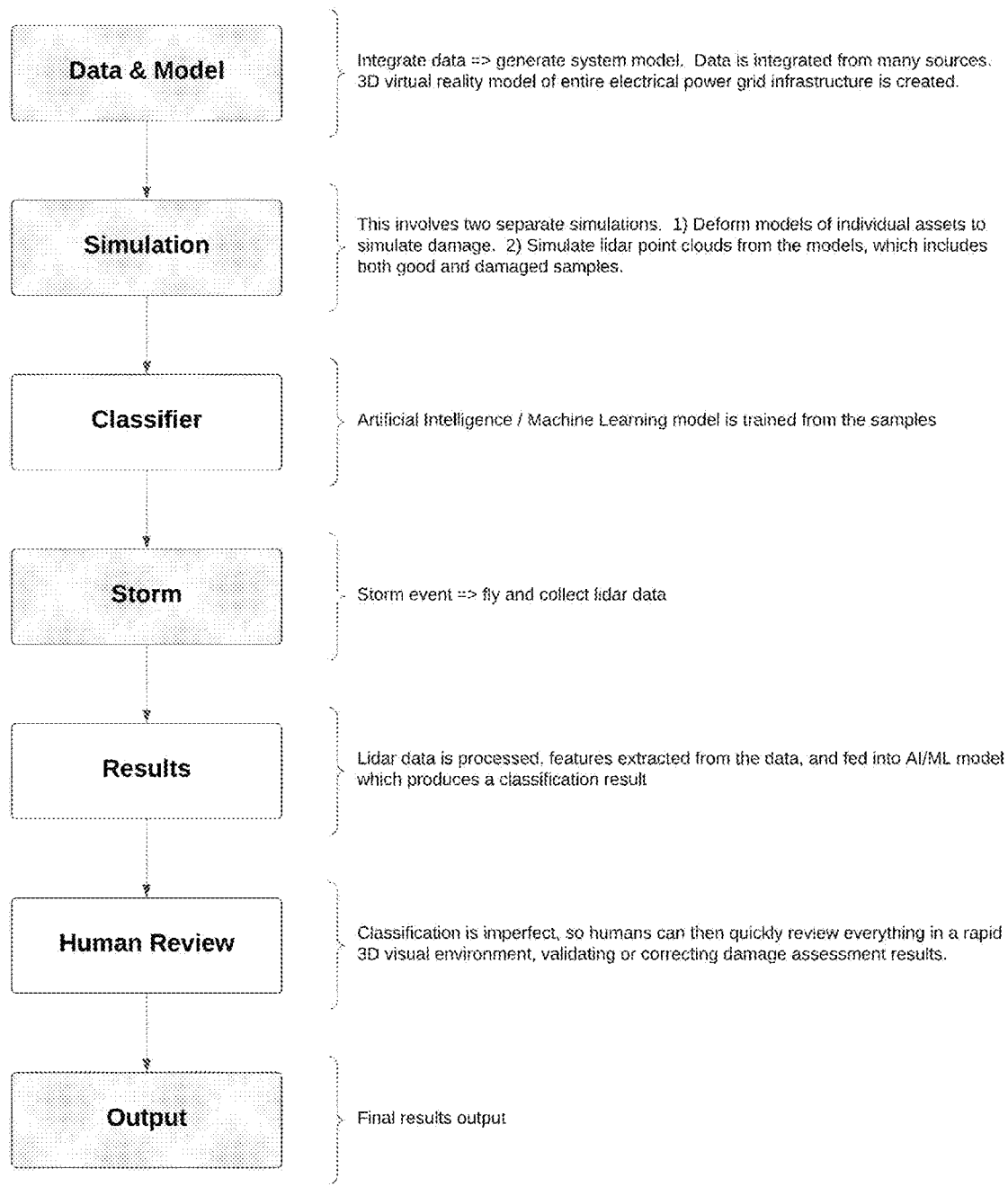
FIG. 2B is an informal simplified schematic view of a flow diagram illustrating aspects of a method, similar to the method shown in FIG. 2A, for automated damage assessment of grid infrastructure, in an exemplary embodiment.

FIG. 2A is a simplified schematic diagram illustrating a method 200 for automated damage assessment of grid infrastructure, in an exemplary embodiment. Except as otherwise described or illustrated, or otherwise suggested by context, method 200 for automated damage assessment of grid infrastructure may be identical to the exemplary method 100 elsewhere described herein and shown in FIG. 1A of this disclosure. FIG. 2B is an informal diagram illustrating aspects of a method 201, similar to method 200, for automated damage assessment.

Referring to FIG. 2A, method 200 may include generating 210 a virtual model system from integrated grid infrastructure data. Method 200 may include executing 275 a trained classifier using a field collected lidar imaging data point cloud of each asset to perform identifying 277 of damaged assets and undamaged assets. Method 200 may include training 290 the classification model.

Figure 31:
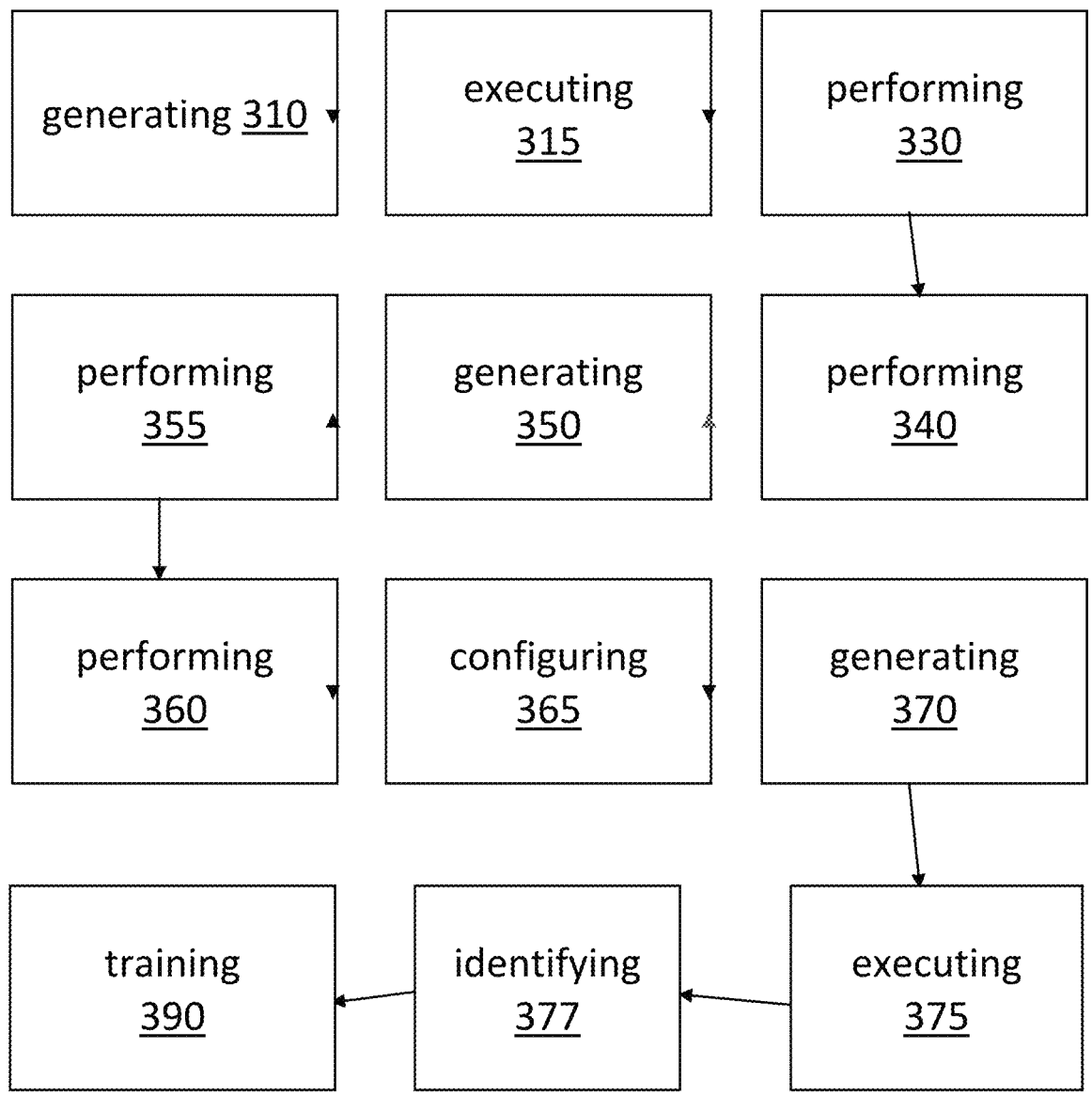
FIG. 31 is a simplified schematic view of a flow diagram illustrating a computer-implemented method 300 for performing automated damage assessment of grid infrastructure, in an exemplary embodiment.

Referring to FIG. 31, in an embodiment, method 300 for automated damage assessment of grid infrastructure, such as T&D infrastructure, may be performed by a computer-implemented system including a processor operable to execute an automated damage assessment algorithm with lidar data collected in the field and a virtual model system of the grid infrastructure in entirety. Method 300 may include generating 310 the virtual model system using integrated physical grid data from a plurality of sources. The plurality of physical grid data sources may include geographic information of the physical grid infrastructure and network topology information of the physical grid infrastructure. The virtual model system may include a three-dimensional (3D) virtual model of the physical grid infrastructure generated by integrating the integrated physical grid data from disparate sources.

In an embodiment, as shown in FIG. 31, a computer-implemented method 300 may include performing an automated damage assessment algorithm by executing 315 a simulation algorithm using the virtual model system to perform the various simulations as herein described. In an embodiment, the simulation algorithm may include a damage simulation and an imaging data simulation, such as a lidar imaging data simulation. In an embodiment, method 300 may further include performing 330 the damage simulation. In an embodiment, method 300 may include performing 340 an asset condition module to simulate undamaged condition of an asset in an undamaged condition mode or damaged condition of an asset in a damaged condition mode. Performing the lidar imaging data simulation may further include, for example, generating 350 a simulated lidar data point cloud for a virtual asset model corresponding to a physical asset. The lidar imaging data simulation may further include performing 355 a flight vehicle simulation executable by a processor to simulate any of the following: lidar sensor travel as carried on the simulated flight vehicle, lidar sensor attitude in relation to the simulated flight vehicle, lidar sensor attitude in relation to the simulated grid infrastructure as carried on the simulated flight vehicle, and particular data collection properties of the lidar sensor.

In an embodiment, as shown in FIG. 31, computer-implemented method 300 for automated damage assessment may further include performing 360 the executable asset condition module to simulate asset condition with the virtual model system of the grid infrastructure. In an embodiment, performing 360 the executable asset condition module may further include configuring 365 the asset condition module to simulate undamaged condition of an asset in an undamaged condition mode or damaged condition of an asset in a damaged condition mode. In an embodiment, the asset condition module in the damaged condition mode may determine simulated damage including any of the following:
 (i) simulated damage generated by automated manipulation of a virtual asset model generated programmatically;
 (ii) simulated damage generated by manual manipulation of grouped points in a lidar data point cloud, where the lidar data point cloud includes real lidar data collected from imaging the physical asset in the field;
 (iii) simulated damage generated by manual manipulation of grouped points in a lidar data point cloud, where the lidar data point cloud includes simulated lidar data created by simulated imaging of the virtual asset model in the virtual model system;
 (iv) simulated damage generated by automated manipulations of grouped points in a lidar data point cloud, where the grouped points are automatically selected and grouped, and where the lidar data point cloud includes real lidar data collected from imaging the physical asset in the field;
 (v) simulated damage generated by automated manipulations of grouped points in a lidar data point cloud, where the grouped points are automatically selected and grouped, and where the lidar data point cloud includes simulated lidar data created by simulated imaging of the virtual asset model in the virtual model system;
 (vi) simulated damage generated by manual creation of a fixed virtual asset model, where the fixed virtual asset model embodies selected hypothetical damage of a particular physical asset represented by the virtual asset model; and (vii) simulated damage generated by automated manipulation of a virtual asset model in predetermined ways, where the virtual asset model in three-dimensions includes keyframe animations allowing manipulation of the virtual asset model in the predetermined ways.

In an embodiment, as shown for example in FIG. 31, in the computer-implemented method 300 for automated damage assessment, the simulation algorithm may include generating 370 a simulated collected lidar imaging data point cloud by performing the executable lidar imaging data simulation, wherein one of the simulated collected lidar imaging data point clouds corresponds to each asset and may be determined by GPS data. In an embodiment, the lidar imaging data simulation may perform the generating 370 by simulating the collection of lidar imaging data by a lidar sensor carried on a flight vehicle to travel along the grid infrastructure. In an embodiment, generating 370 may include simulated travel of a virtual model flight vehicle to carry a simulated lidar sensor along the grid infrastructure to image the plurality of virtual model assets in the virtual model system of the grid infrastructure.

In an embodiment, as shown for example in FIG. 31, the computer-implemented method 300 for automated damage assessment may include executing 375 a trained classifier of the automated damage assessment algorithm. Executing 375 the trained classifier may use field collected lidar imaging data of assets to perform identifying 377 of damaged assets and undamaged assets. Following a storm that may damage grid infrastructure, the field collected lidar imaging data of physical assets may be collected, in the physical field as opposed to the virtual model system, by a physical lidar sensor carried on a physical flight vehicle surveying or traversing the physical grid infrastructure in entirety. In an embodiment, the post-storm field collected lidar imaging data of assets may be processed to extract features from the raw field collected lidar imaging data to enable identification of assets by locations, such as locations determined from GPS data collected during the post-storm flight to perform the field collection of lidar imaging data of physical assets. The trained classifier may include a trained classification model to receive and use the post-storm field collected lidar imaging data of assets to perform identifying 377 of damaged assets and undamaged assets. In an embodiment, the trained classification model may access or include a machine learning algorithm. In an embodiment, the trained classification model may access or include an artificial intelligence algorithm. In an embodiment, method 300 may include training 390 the classification model. The classification model may be trained 390 by processing field collected lidar imaging data of a plurality of assets, simulated collected lidar imaging data of a plurality of assets, or both, wherein the plurality of assets includes both damaged assets and undamaged assets, with the condition of same being identified for training the classification model.

Figure 32:
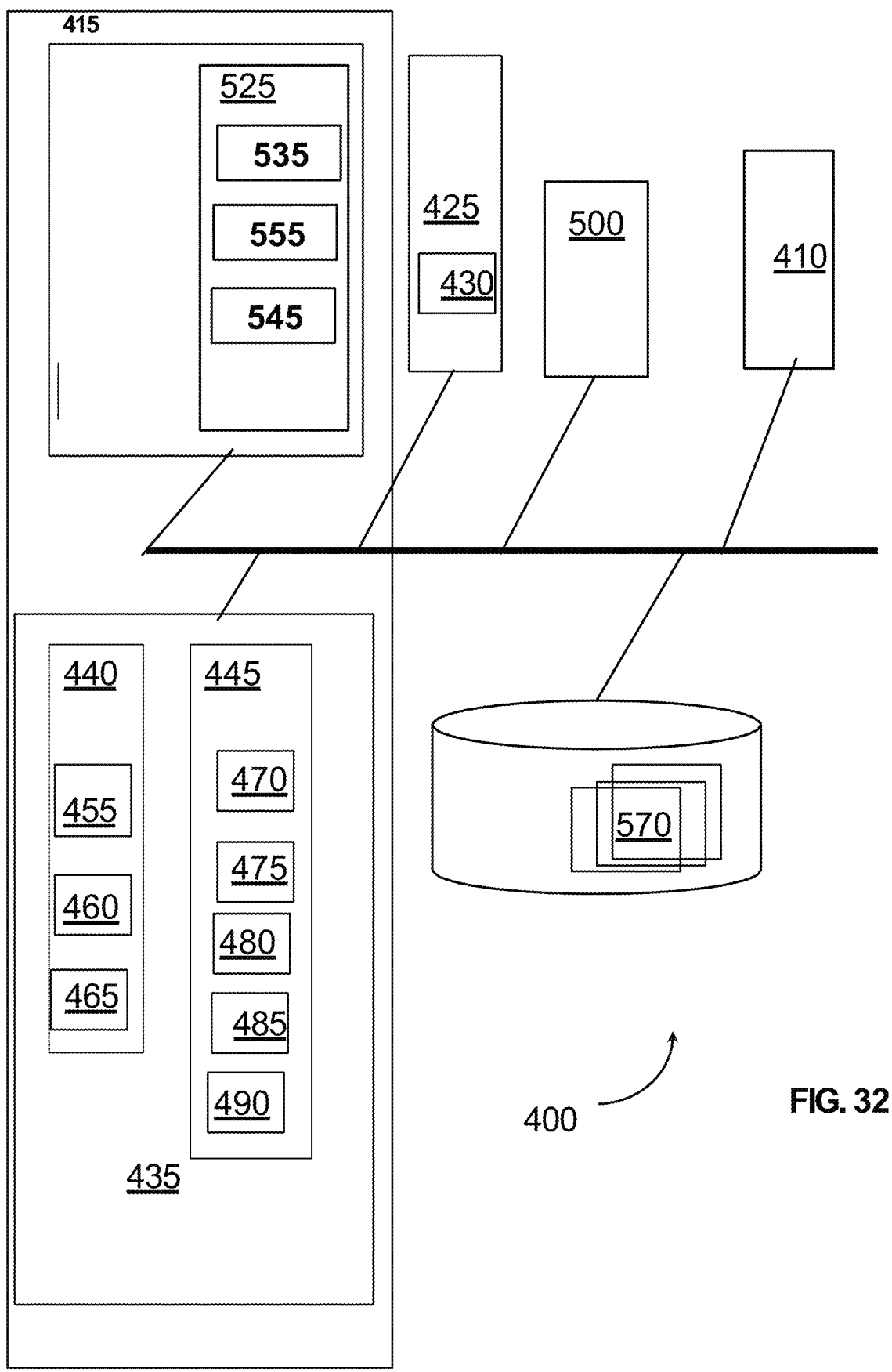
FIG. 32 is a simplified schematic view of a flow diagram illustrating a computer-implemented system 400 for performing automated damage assessment of grid infrastructure, in an exemplary embodiment.

Referring to FIG. 32, in an embodiment, a computer-implemented system 400 for automated damage assessment of grid infrastructure, such as T&D infrastructure, may include a processor 410 operable to execute an automated damage assessment algorithm 415 with a field collected lidar imaging data point cloud 470 and a virtual model system 425 of the grid infrastructure in entirety. Such a system 400 for automated damage assessment may include generating the virtual model system 425 by integrating physical grid data 430 from a plurality of sources. The plurality of physical grid data 430 sources may include geographic information of the physical grid infrastructure and network topology information of the physical grid infrastructure. The virtual model system 425 may include a three-dimensional (3D) virtual model of the physical grid infrastructure generated by integrating the integrated physical grid data 430 from disparate sources.

Referring to FIG. 32, in computer-implemented system 400, the automated damage assessment algorithm 415 may further include a simulation algorithm 435 using the virtual model system 425 to perform the various simulations as herein described. In an embodiment, the simulation algorithm 435 may include a damage simulation 440 and an imaging data simulation 445, which may be a lidar imaging data simulation. In an embodiment, the damage simulation 440 may include an asset condition module 455 executable to simulate an undamaged asset 460 in undamaged condition in an undamaged condition mode or a damaged asset 465 in damaged condition in a damaged condition mode. The lidar imaging data simulation 445 may include a simulated collected lidar imaging data point cloud 470 for a virtual model asset 475 corresponding to a physical asset. The lidar imaging data simulation 445 may further include a flight vehicle simulation 480 executable by processor 410 to simulate any of the following: travel of a lidar sensor 485 as carried on the simulated flight vehicle 490, lidar sensor attitude in relation to the simulated flight vehicle, lidar sensor attitude in relation to the simulated grid infrastructure as carried on the simulated flight vehicle, and particular data collection properties of the lidar sensor.

In an embodiment, as shown in FIG. 32, computer-implemented system 400 may include an executable asset condition module 500 to simulate asset condition with the virtual model system 425 of the grid infrastructure. In an embodiment, performing the executable asset condition module 500 may further include configuring the module 500 to simulate undamaged condition of an undamaged asset 460 in an undamaged condition mode or damaged condition of a damaged asset 465 in a damaged condition mode. In an embodiment, the asset condition module 500 in the damaged condition mode may determine simulated damage including any of the following:

(i) simulated damage generated by automated manipulation of a virtual asset model generated programmatically;

(ii) simulated damage generated by manual manipulation of grouped points in a lidar data point cloud, where the lidar data point cloud includes real lidar data collected from imaging the physical asset in the field;

(iii) simulated damage generated by manual manipulation of grouped points in a lidar data point cloud, where the lidar data point cloud includes simulated lidar data created by simulated imaging of the virtual asset model in the virtual model system;

(iv) simulated damage generated by automated manipulations of grouped points in a lidar data point cloud, where the grouped points are automatically selected and grouped, and where the lidar data point cloud includes real lidar data collected from imaging the physical asset in the field;

(v) simulated damage generated by automated manipulations of grouped points in a lidar data point cloud, where the grouped points are automatically selected and grouped, and where the lidar data point cloud includes simulated lidar data created by simulated imaging of the virtual asset model in the virtual model system;

(vi) simulated damage generated by manual creation of a fixed virtual asset model, where the fixed virtual asset model embodies selected hypothetical damage of a particular physical asset represented by the virtual asset model; and (vii) simulated damage generated by automated manipulation of a virtual asset model in predetermined ways, where the virtual asset model in three-dimensions includes keyframe animations allowing manipulation of the virtual asset model in the predetermined ways.

In an embodiment, as shown for example in FIG. 32, the computer-implemented system 400 may include simulation algorithm 435 which may generate a plurality of simulated collected lidar imaging data point cloud 470 by performing the executable lidar imaging data simulation 445, wherein each of a plurality of simulated collected lidar imaging data point clouds 470 corresponds to a virtual model asset 475 of each physical asset, and the corresponding assets may be determined by GPS data. In an embodiment, the lidar imaging data simulation 445 may perform the generating by simulating the collection of a lidar imaging data point cloud by a lidar sensor 485 carried on a flight vehicle to travel along the grid infrastructure. In an embodiment, generating may include simulated travel of a virtual model flight vehicle 490 to carry a simulated lidar sensor 485 along the grid infrastructure to image the plurality of virtual model assets 475 in the virtual model system 425 of the grid infrastructure.

In an embodiment, as shown in FIG. 32, the computer-implemented system 400 for automated damage assessment may include a trained classifier 525 of the automated damage assessment algorithm 415. Executing the trained classifier 525 may use field collected lidar imaging data of assets to perform identifying of damaged assets 465 and undamaged assets 460. Following a storm that may damage grid infrastructure, the field collected lidar imaging data point clouds 570 of physical assets may be collected, in the physical field as opposed to the virtual model system 425, by a physical lidar sensor 485 carried on a physical flight vehicle 505 surveying or traversing the physical grid infrastructure in entirety. In an embodiment, the post-storm field collected lidar imaging data point clouds 570 of physical assets may be processed to extract features from the raw field collected lidar imaging data to enable identification of assets by locations, such as locations determined from GPS data collected during the post-storm flight to perform the field collection. The trained classifier 525 may include a trained classification model 535 to receive and use the post-storm field collected lidar imaging data point clouds 570 of physical assets to perform identifying of damaged assets 465 and undamaged assets 460. In an embodiment, the trained classification model 535 may access or include a machine learning algorithm 545. In an embodiment, the trained classification model may access or include an artificial intelligence algorithm 555. In an embodiment, the classification model 535 may be trained by processing actual field collected lidar imaging data point clouds 570 of a plurality of physical assets, simulated collected lidar imaging data point clouds 470 of a plurality of virtual model assets 475, or both, wherein the plurality of assets includes both damaged assets 465 and undamaged assets 460, and with the condition of same being identified for training the classification model 535.

In an embodiment, two distinct simulations may be necessary. Damage simulation may be accomplished in a variety of ways, as described herein. Lidar simulation may be separate from damage simulation, and may include simulating a point cloud representation of an asset model.

In an embodiment, for each asset type, damage that might occur in a storm may be simulated. Structures may be deformed in a large number of ways, such as breaking crossarms, insulators, bending towers, breaking poles, and leaning poles.

In an embodiment, automated damage may be simulated by generating a model programmatically and then manipulating it in predetermined ways as allowed by its programmatic definition.

In an embodiment, manual damage may be simulated by selecting and grouping points in a point cloud, whether it be a real or simulated point cloud, and manipulating them.

In an embodiment, manual damage may be simulated by creating a fixed 3D model that exemplifies some damage scenario.

In an embodiment, automated damage may be simulated by automatically selecting and grouping points in a point cloud and applying automatic manipulations to them.

In an embodiment, automated damage may be simulated by creating a 3D model containing keyframe animations which allow the model to be manipulated in predetermined ways.

In an embodiment, lidar point cloud data may be simulated from the system model. In an embodiment, lidar which may be collected by a flight vehicle may be simulated foor both damaged and undamaged assets, on an asset-by-asset basis across the entire system, taking into account varying pole class and heights, equipment configurations, and other variables.

Figure 3:
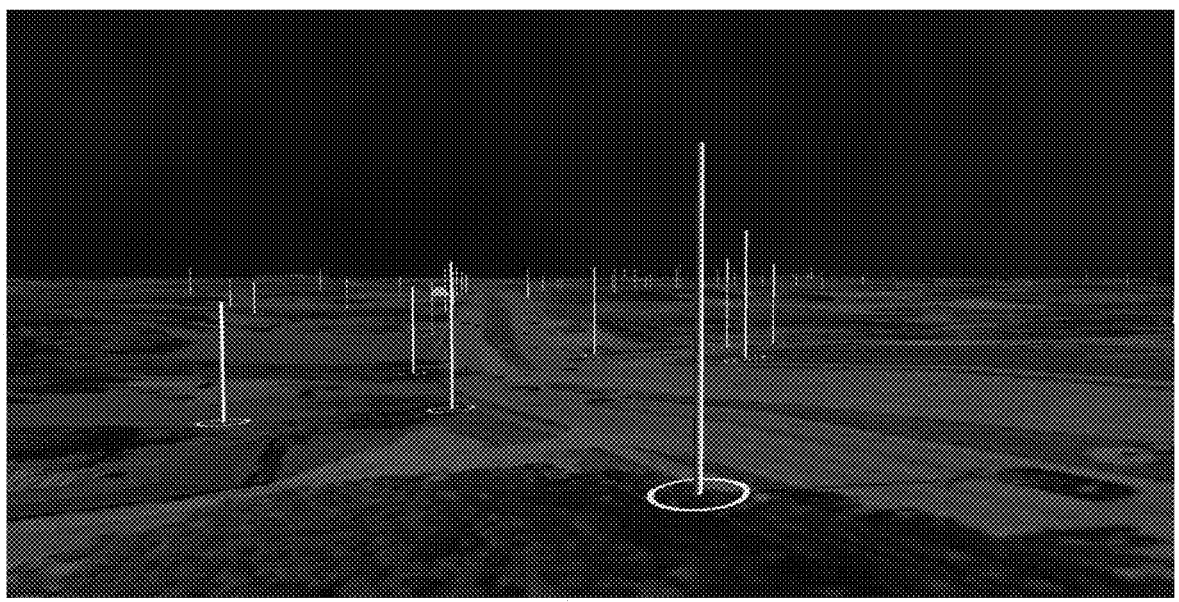
FIG. 3 is a simplified scene view of virtual asset models for undamaged modeled monopoles in distribution network grid infrastructure, in an embodiment.
Figure 4:
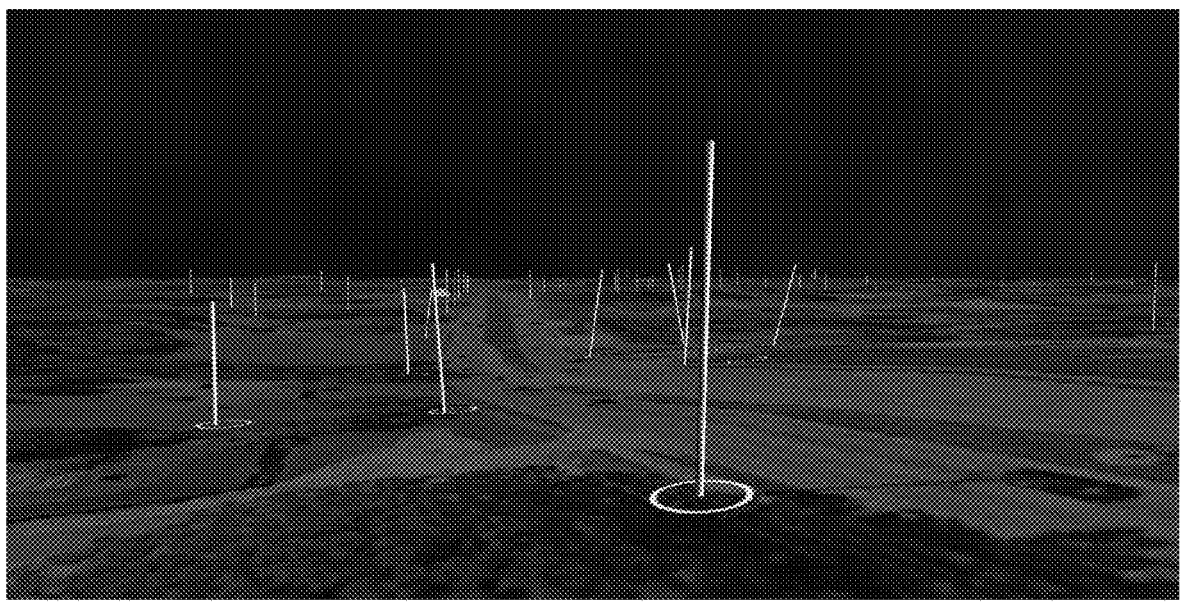
FIG. 4 is a simplified scene view similar to FIG. 3 of virtual asset models for both damaged and undamaged modeled monopoles, in an embodiment.

In an embodiment, as shown in FIG. 3, mono poles in a distribution network may be simulated with a simple cylinder. For these types of assets, a cylinder may be generated that matches the height and diameter of the asset record of the mono pole. Deformations may then be applied to the pole, such as leaning it, as seen in FIG. 4, which shows a scene of varied modeled monopoles, some leaning from vertical and/or offset from their initial locations, in a distribution network. FIG. 3 shows ideal poles, perfectly vertical and precisely located according to their asset records. As shown in FIG. 4, random variations may be applied to the poles, which includes both good and damaged samples. Both lean and locational offsets may be applied. The sample is considered damaged if the lean exceeds a maximum threshold, or if the offset is too far away from the original location.

Figure 5:
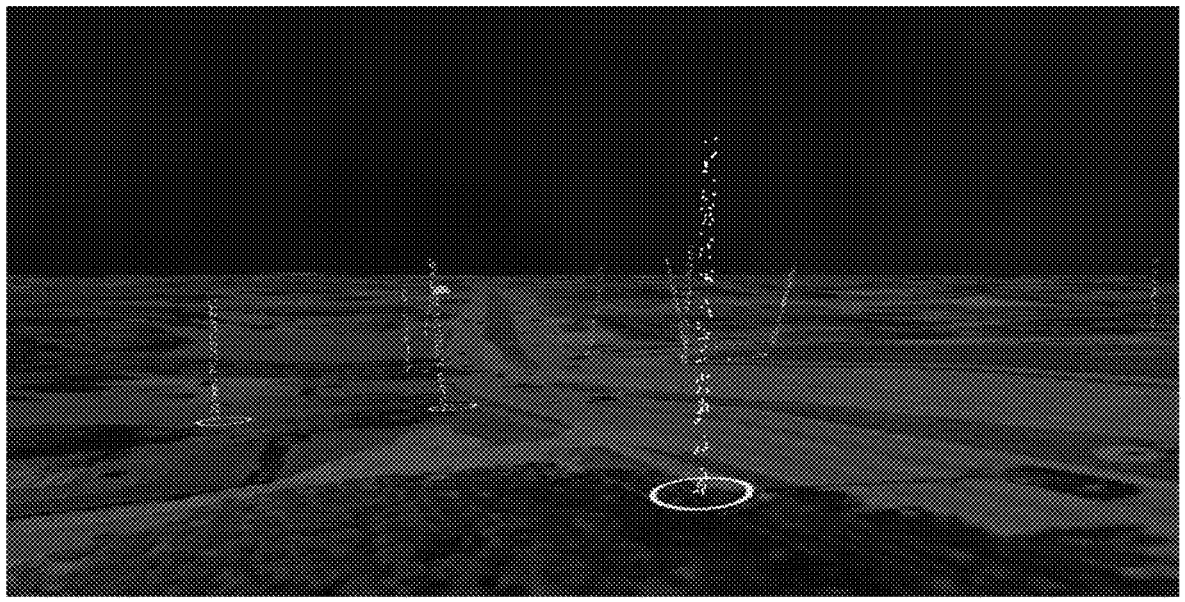
FIG. 5 is a simplified scene view similar to FIG. 4 of simulated lidar data point clouds of virtual asset models for both damaged and undamaged modeled monopoles, in an embodiment.
Figure 6:
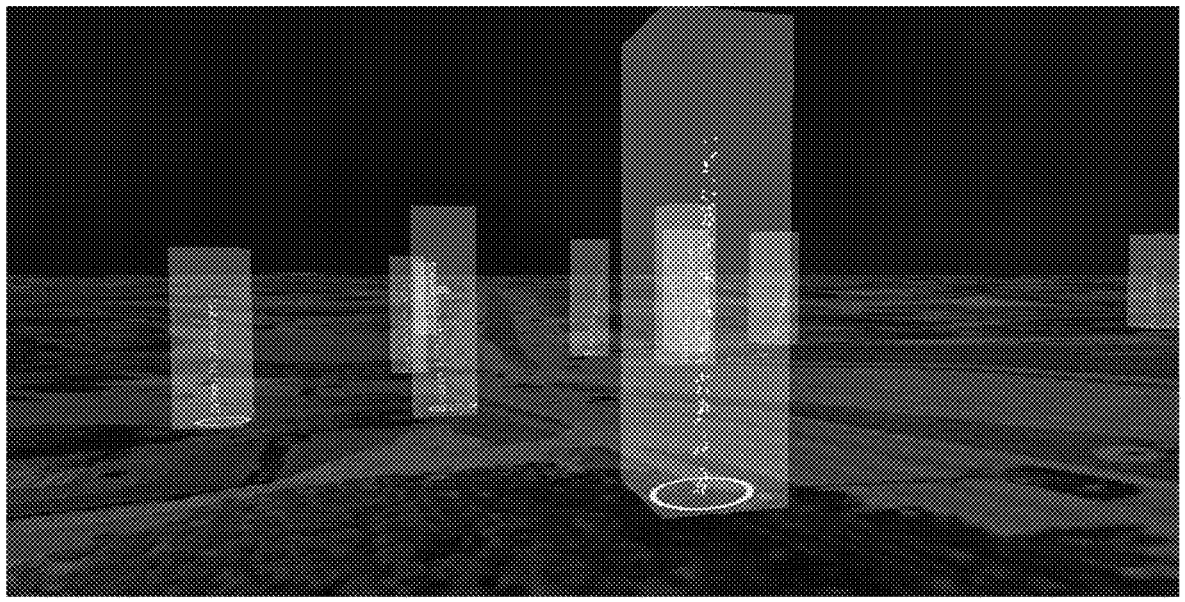
FIG. 6 is a simplified scene view similar to FIG. 5 showing volume boxes positioned to collect simulated lidar data point clouds of virtual asset models for both damaged and undamaged modeled monopoles, in an embodiment.

In an embodiment, as shown in FIG. 5, a simulated lidar point cloud may then be generated based on the model. The point density can be randomly variable. As shown in FIG. 6, volume boxes may be positioned around the asset to collect the simulated point cloud.

In an embodiment, software may be used to select and group points and then apply some deformation to them, such as moving, rotating, bending, or stretching, among other forms of damage. This may be the most time-consuming approach.

Figure 7:
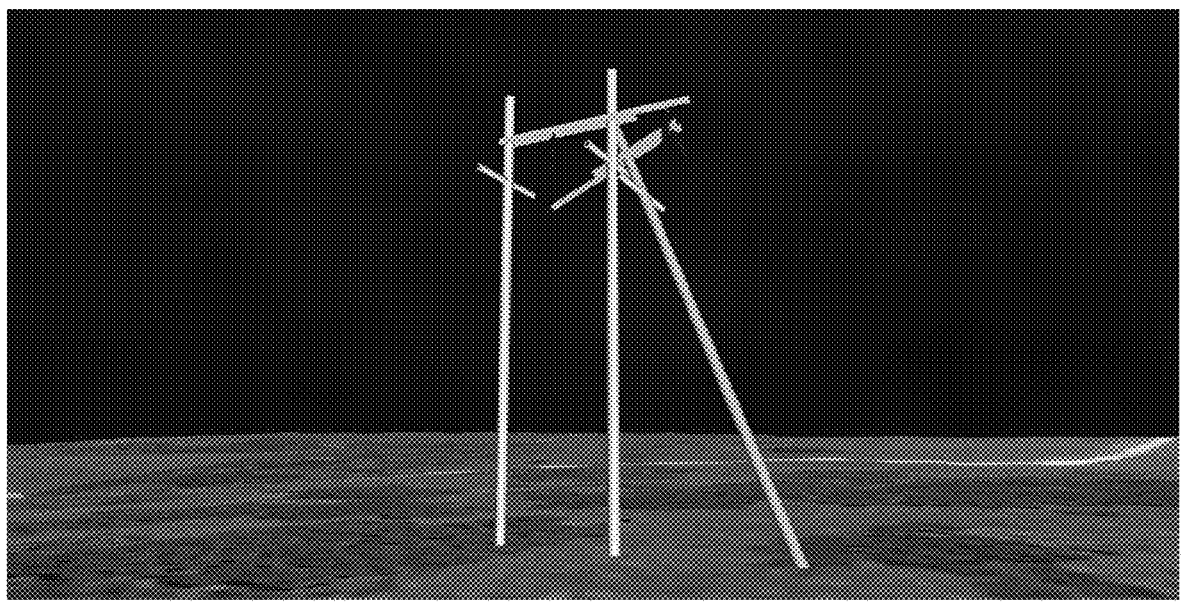
FIG. 7 is a simplified scene view of a fixed 3D virtual asset model of a damaged 3 pole transmission structure in distribution network grid infrastructure, in an embodiment.
Figure 8:
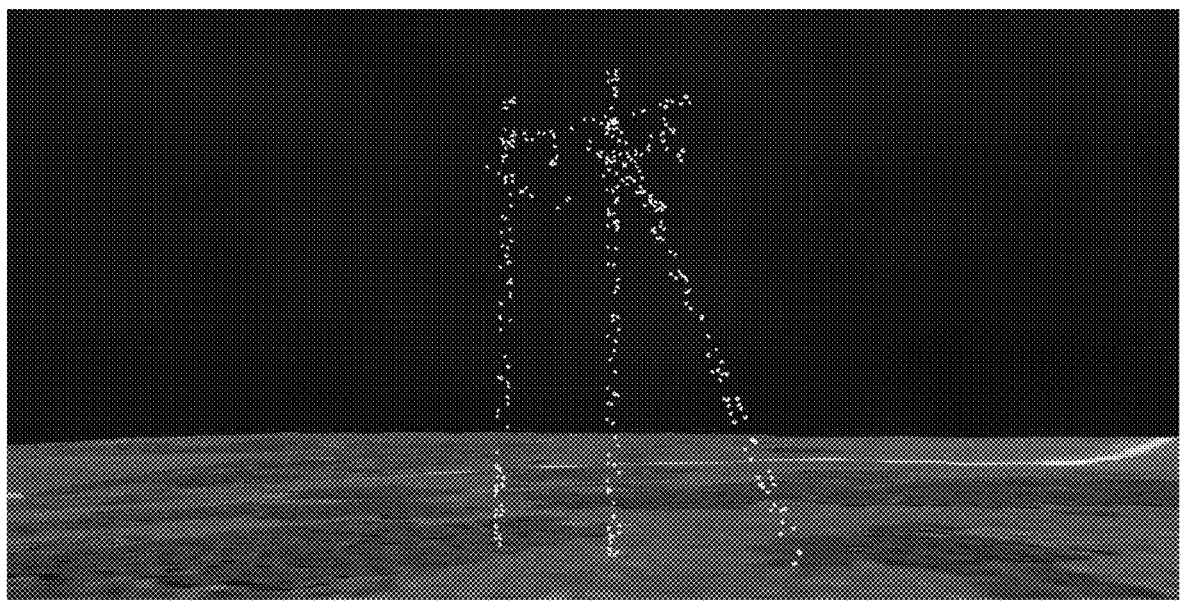
FIG. 8 is a simplified scene view of a simulated lidar data point cloud of the virtual asset model of the damaged 3 pole transmission structure shown generally in FIG. 7, in an embodiment.
Figure 9:
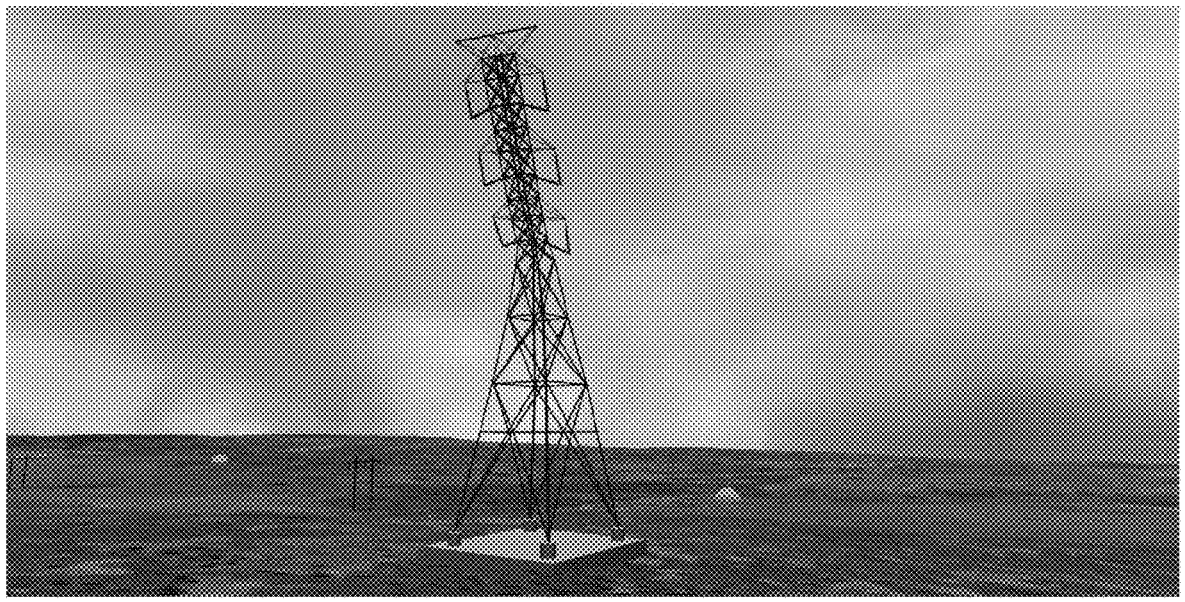
FIG. 9 is a simplified scene view of a virtual asset model of a damaged lattice tower structure in distribution network grid infrastructure, in an embodiment.
Figure 10:
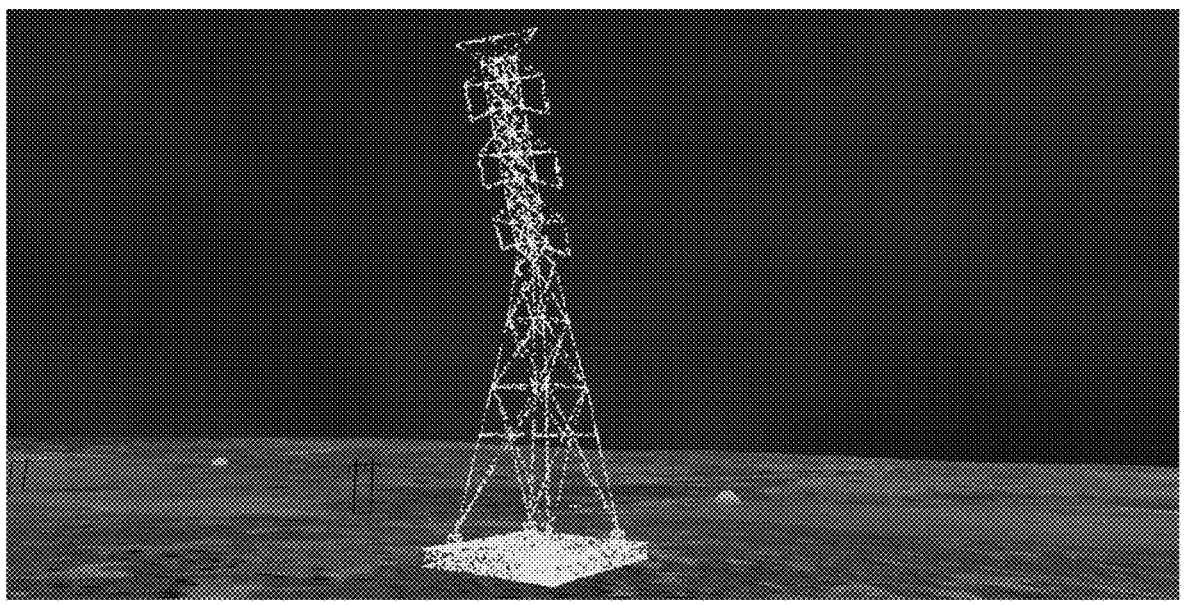
FIG. 10 is a simplified scene view of a simulated lidar data point cloud of the virtual asset model of the damaged lattice tower structure shown generally in FIG. 9, in an embodiment.
Figure 11:
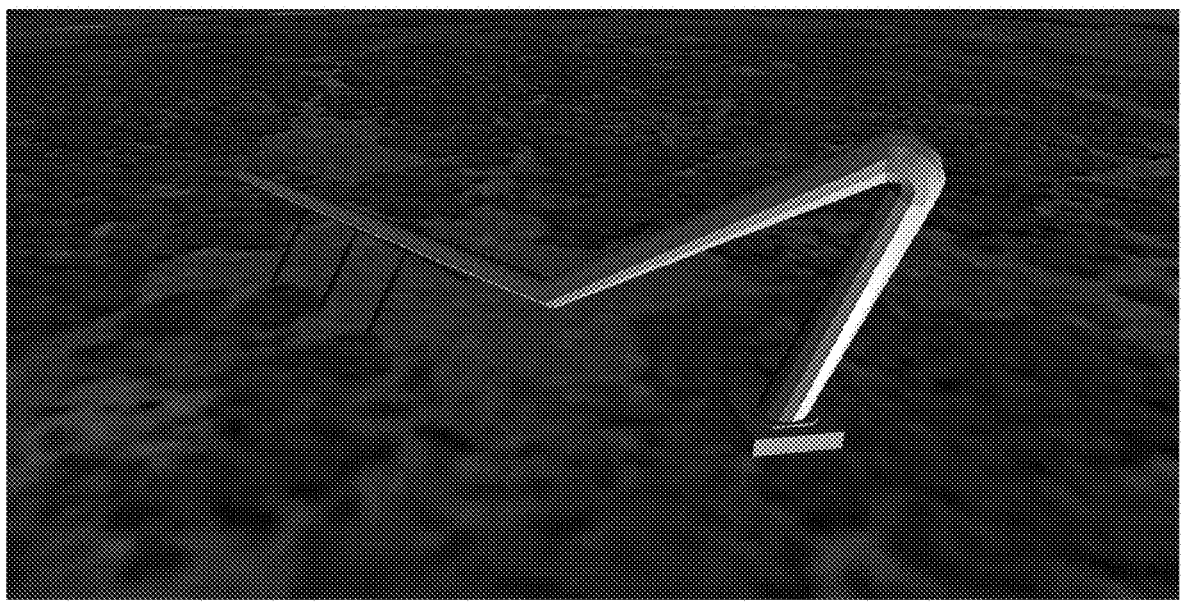
FIG. 11 is a simplified scene view of a virtual asset model of a damaged metal monopole in distribution network grid infrastructure, in an embodiment.
Figure 12:
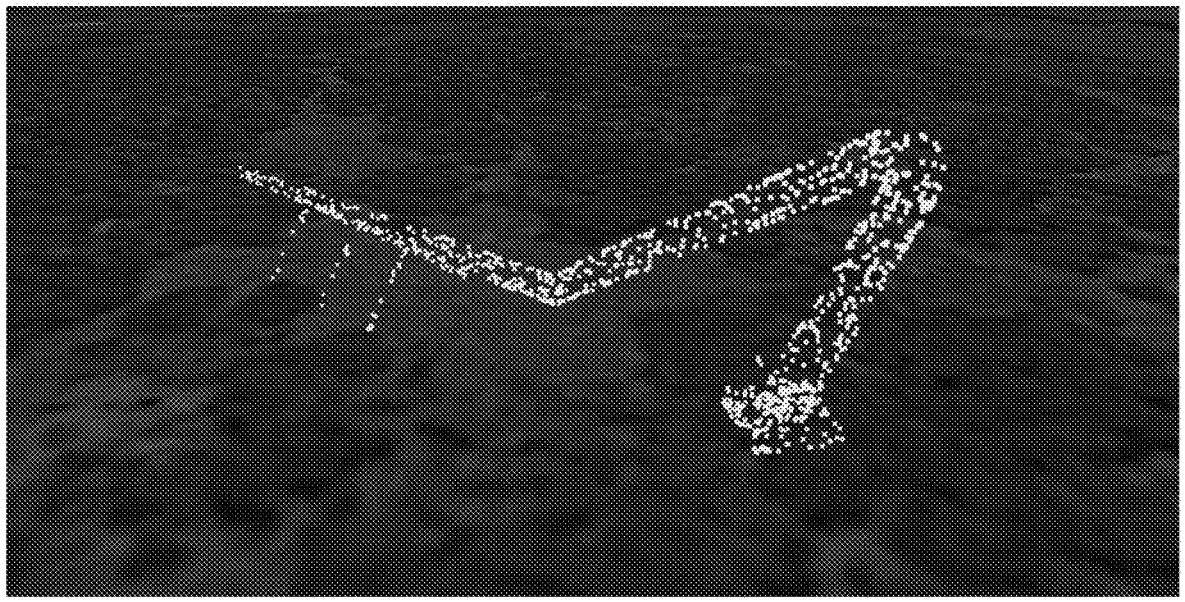
FIG. 12 is a simplified scene view of a simulated lidar data point cloud of the virtual asset model of the damaged metal monopole shown generally in FIG. 11, in an embodiment.

In an embodiment, as shown in FIGS. 7-12, damage may be simulated manually with a rigid model. This may be a good approach for damage scenarios that are difficult to define programmatically, or which require higher resolutions. A catalog of damage samples may be easily and relatively inexpensively created this way. In an embodiment, photos of damage that occurred in storms may be used as a reference and models may be created resembling the types of damage that is known to occur from the past. FIG. 7 shows a model of a broken 3 pole transmission structure, wherein crossarm may be broken and one of the poles may be leaning into the remainder of the structure. FIG. 8 shows lidar simulated from the damaged 3 pole model. This may be a low density point cloud. FIGS. 9 and 10 show a model of damaged lattice structure, where the structure may be bent. FIG. 11 shows a model of a bent metal monopole. FIG. 12 shows lidar simulated on a damaged metal monopole. Density of the point cloud of simulated lidar data may vary.

In an embodiment, automated damage by automatically manipulating lidar points may be applied to any damage scenario; however said approach may be complex and time consuming. Said approach may be best suited for situations that can be well described mathematically.

In an embodiment, automated damage by automatically manipulating lidar points may rely on an algorithmic manipulation of the point cloud, which may further rely on an algorithm having an understanding of the geometry and underlying mechanical physics of an asset and surrounding environment in question. Certain types of structures, such as metal lattice structures, may be randomly bent and deformed in predictable ways based on physics of wind and other forces applied to a structure, causing it to collapse. Noise may also be added to simulate atmospheric noise, laser returns that occur from moisture in the air.

Said approach may be satisfactory for existing real-world point clouds. Points associated with an asset may be isolated, based on region of interest and classification, such as identifying and filtering points for the ground and conductors. A point cloud for an asset may be manipulated algorithmically, without necessarily needing to understand geometry of a specific asset because many asset types may share traits. For example, most transmission and distribution structures are vertical. Regardless of the construction material, wood, metal, or concrete, and regardless of the geometry, poles, lattice, one or multiple crossarms, etc., the basic structures may be similar in that they may be some vertical structure bearing the weight of conductors. In an embodiment, common deformations may be automatically applied to said types of structures to simulate certain types of damage.

Figure 13A:
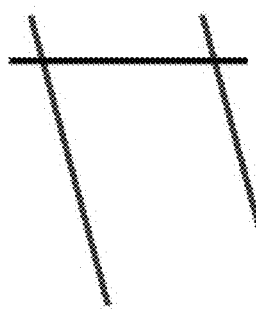
FIG. 13A is a simplified schematic view of a simplified 2D virtual asset model of an H frame transmission structure in a left leaning position, in an embodiment.
Figure 13B:
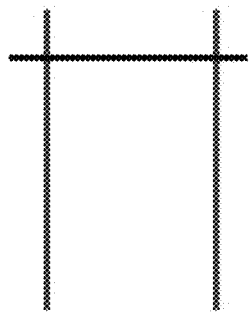
FIG. 13B is a simplified schematic view of a simplified 2D virtual asset model of the H frame transmission structure shown in FIG. 13A, with the H-frame in an upright position.
Figure 13C:
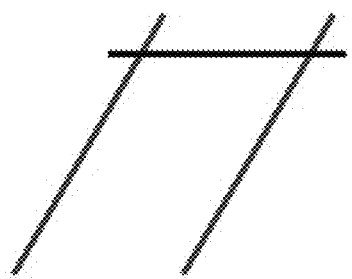
FIG. 13C is a simplified schematic view of a simplified 2D virtual asset model of the H frame transmission structure shown in FIG. 13B, with the H-frame in a right leaning position.
Figure 14:
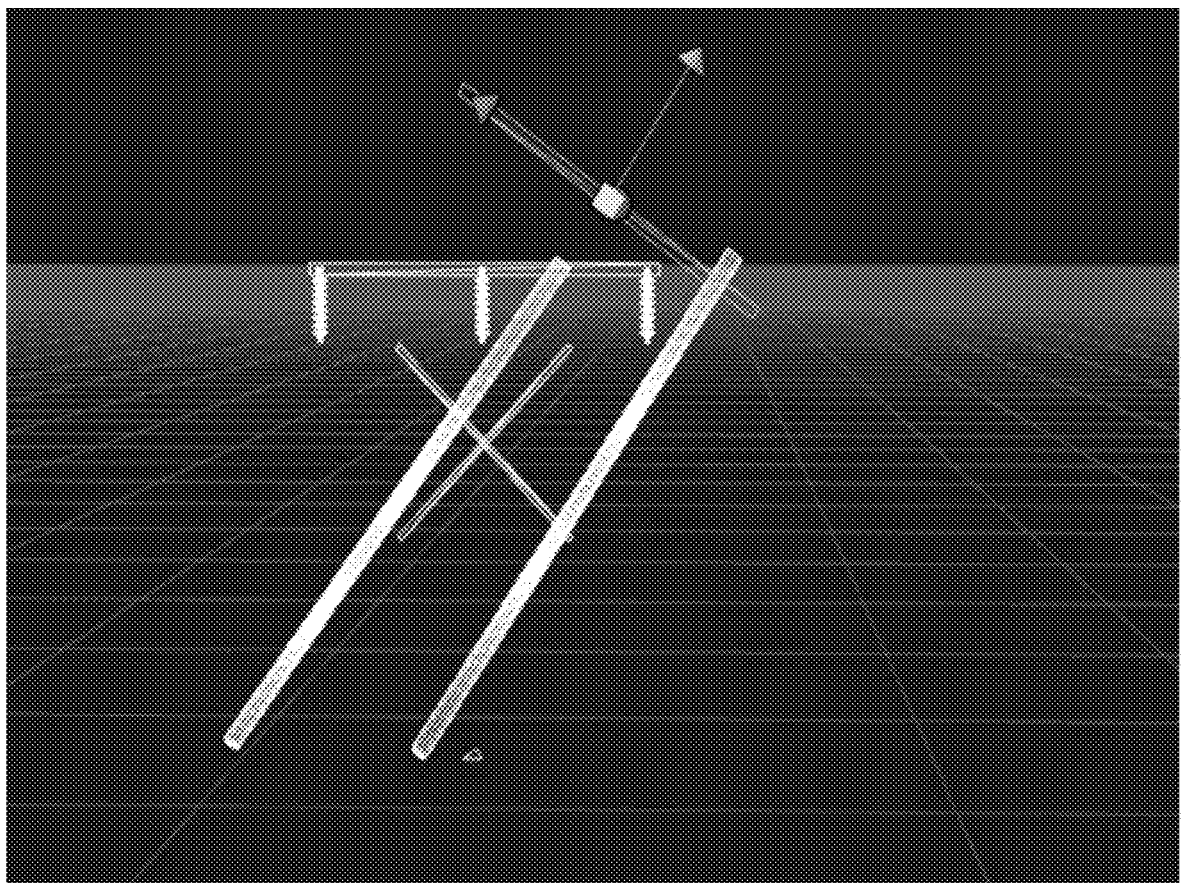
FIG. 14 is a simplified schematic view of a rigid virtual asset model of a damaged H frame, in an embodiment.
Figure 15:
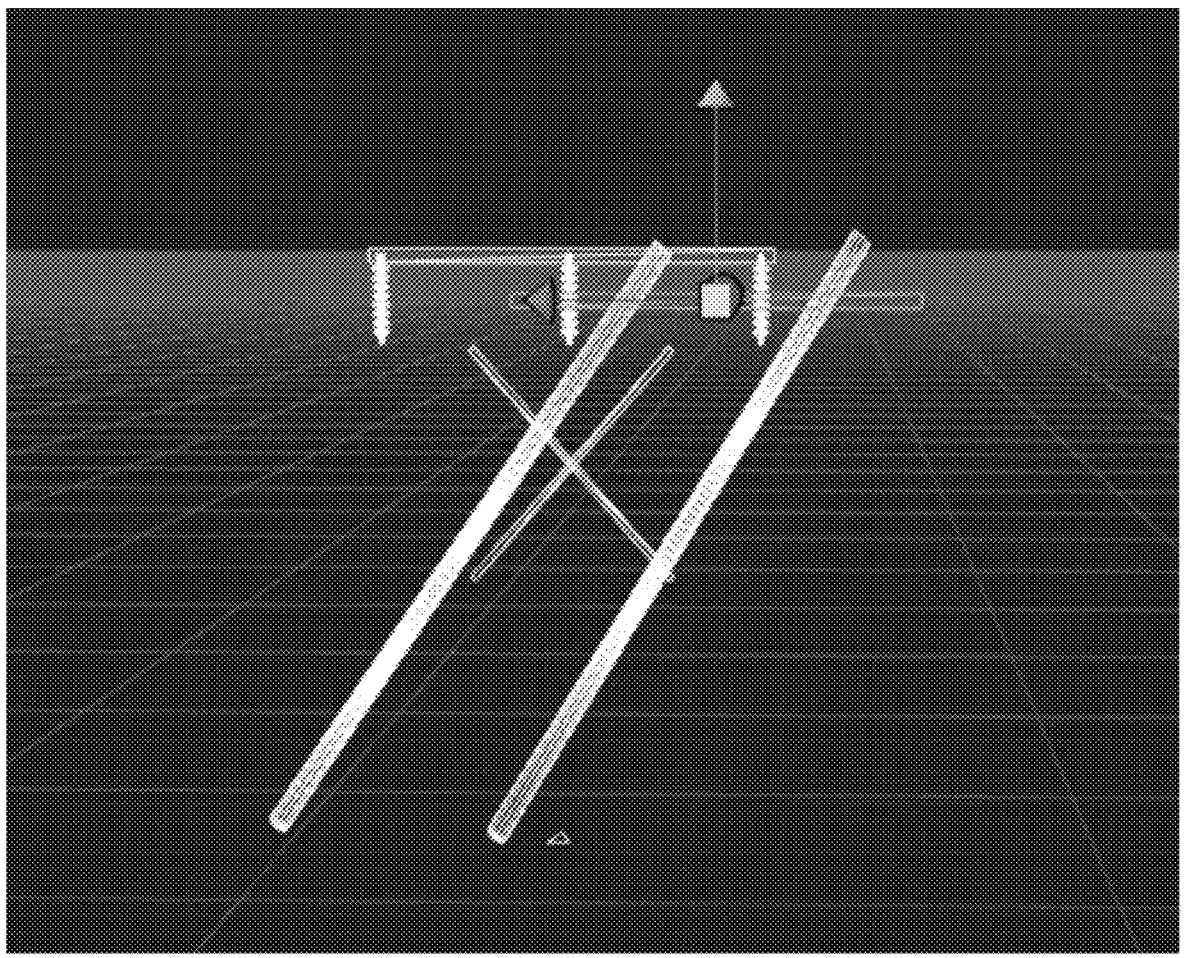
FIG. 15 is a simplified schematic view of a rigid virtual asset model of a damaged H frame shown in FIG. 14, with crossarm positioned for rotation.
Figure 16:
FIG. 16 is a simplified scene view of a virtual asset model of an undamaged H frame transmission structure in vertical and upright position, in an embodiment.
Figure 17:
FIG. 17 is a simplified scene view of a virtual asset model of the H frame transmission structure shown generally in FIG. 16, with keyframe animation showing a first leaning position, in an embodiment.
Figure 18:
FIG. 18 is a simplified scene view of a virtual asset model of the H frame transmission structure shown generally in FIG. 17, with keyframe animation showing a second leaning position, in an embodiment.
Figure 19:
FIG. 19 is a simplified scene view of a virtual asset model of the H frame transmission structure shown generally in FIG. 18, with keyframe animation showing a third leaning position, in an embodiment.
Figure 20:
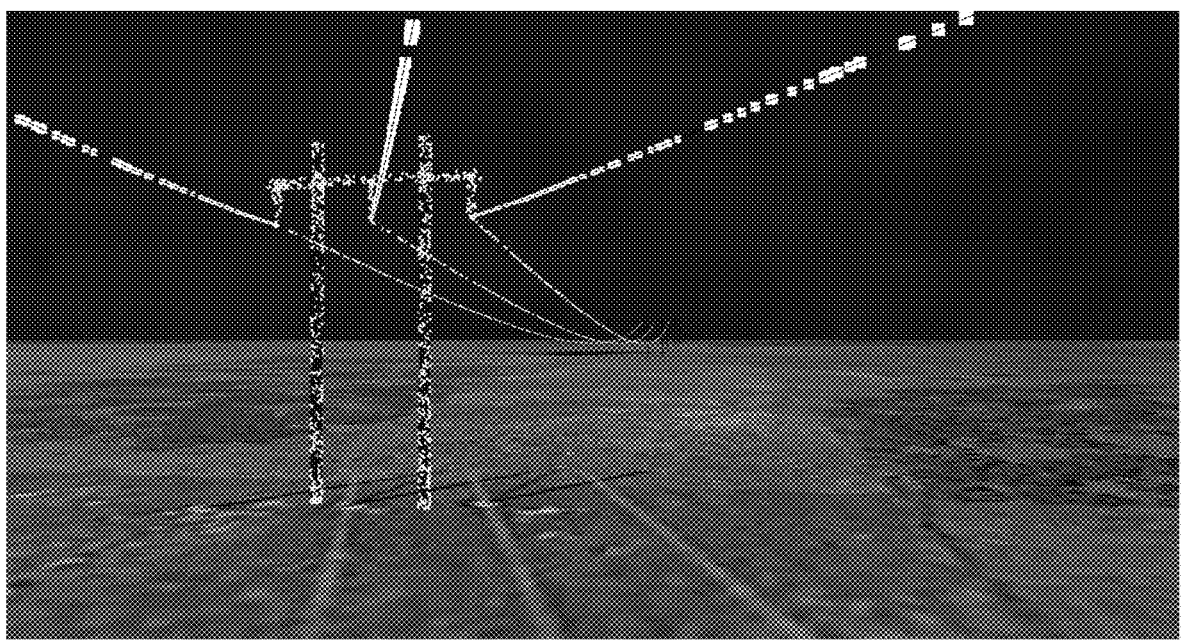
FIG. 20 is a simplified scene view of simulated lidar data point cloud of the virtual asset model of the H frame transmission structure shown generally in FIG. 16, in a vertical, upright position.
Figure 21:
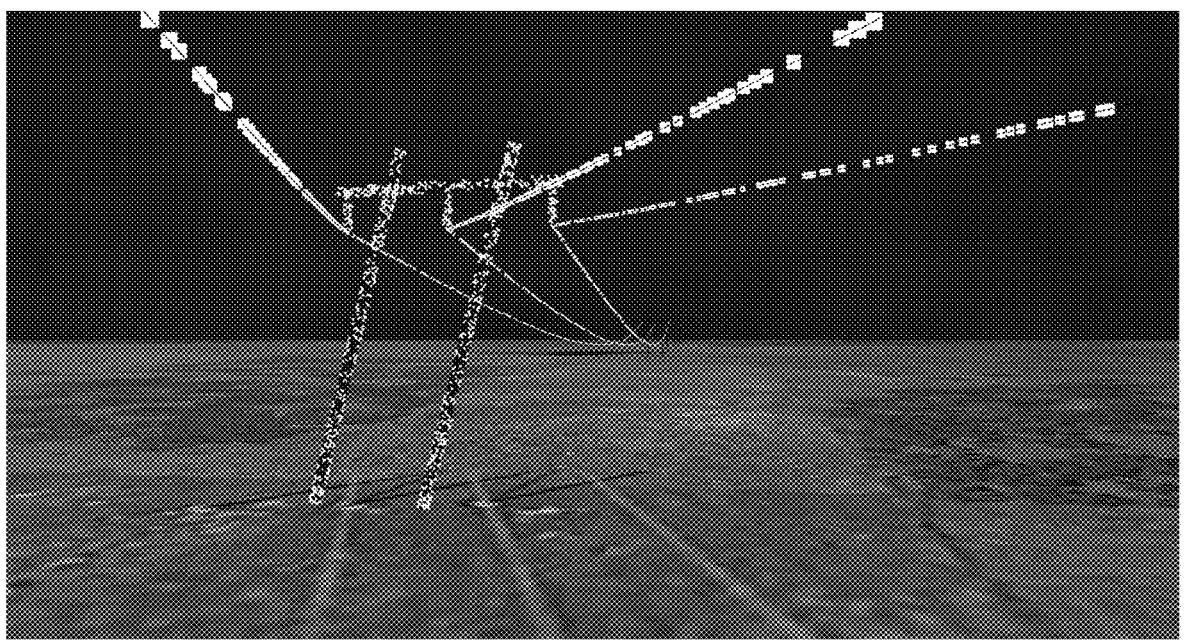
FIG. 21 is a simplified scene view of simulated lidar data point cloud of the virtual asset model of the H frame transmission structure shown generally in FIG. 17, with keyframe animation showing the first leaning position.
Figure 22:
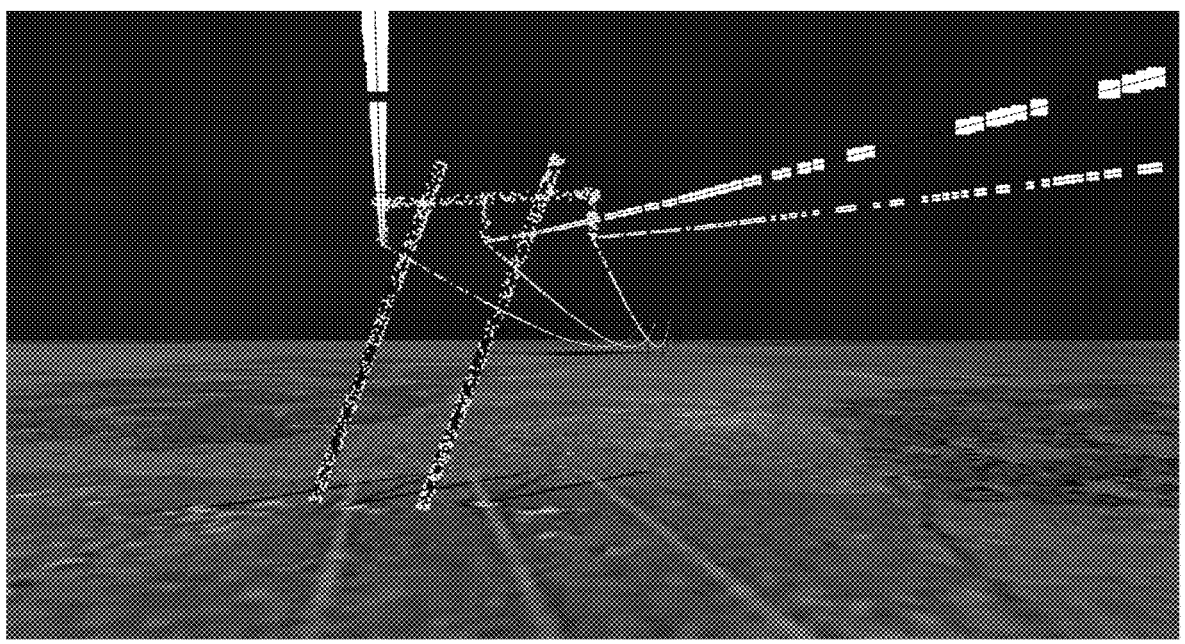
FIG. 22 is a simplified scene view of simulated lidar data point cloud of the virtual asset model of the H frame transmission structure shown generally in FIG. 18, with keyframe animation showing the second leaning position.
Figure 23:
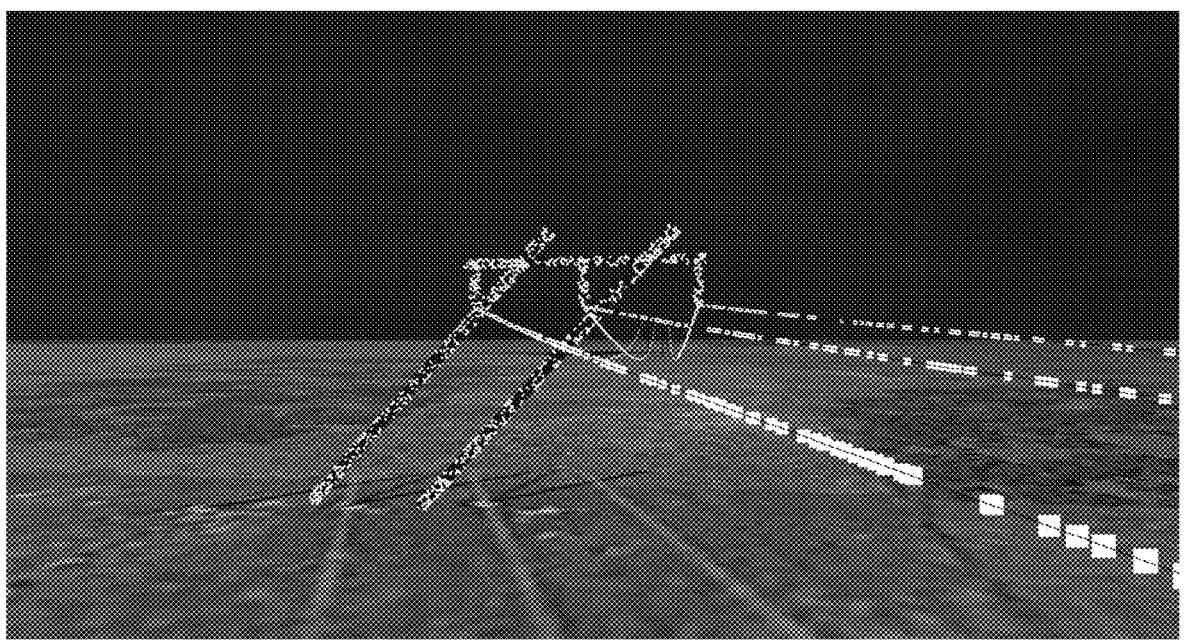
FIG. 23 is a simplified scene view of simulated lidar data point cloud of the virtual asset model of the H frame transmission structure shown generally in FIG. 19, with keyframe animation showing the third leaning position.

In an embodiment, damage may be automated by creating a 3D model containing keyframe animations. Some damage, for example, may be automated if there is no other feasible way to create a volume of necessary samples. Said approach may be difficult to accomplish programmatically, purely with code and math, due to the complexity of a structure. FIG. 13 shows the problem of simulating lean on an H frame. FIG. 13 conceptualizes leans applied to an H frame. Compared to a monopole, H frames may be complex structures. A mono pole may be just a cylinder, which may easily be rotated about an axis at a base of a point where it meets the ground to simulate a leaned state. An H frame may involve two poles connected by a crossarm. The crossarm may be rigid and bind the two poles. By the physics of said structure, if one pole leans, those forces may extend to the crossarm and pull the other pole over with it. FIG. 14 shows a rigid model of an H frame and how it may naturally react when a pole is leaned. If a rotation is applied to one of the poles, the crossarm being fixed may rotate with it. FIG. 15 shows how, in an embodiment, a crossarm may be desired to be positioned in order to simulate real-world physics of a lean in a structure. To accomplish this, said crossarm may need to be rotated separately from and subsequently to the pole.

In an embodiment, by executing a series of hierarchical rotations to independent parts of a model, the physics of leaning a structure may be simulated. This may be done programmatically but it may be time laborious and require technical skill to implement. An alternative may be keyframe animations.

In animation and filmmaking, a key frame (or keyframe) is a drawing or shot that defines the starting and ending points of a smooth transition. These are called frames because their position in time is measured in frames on a strip of film or on a digital video editing timeline. A sequence of key frames may define which movement the viewer may see, whereas the position of the key frames on the film, video, or animation may define the timing of the movement.

In an embodiment, nodes called "bones," as in the bones that form a skeletal structure, may be added to models. These may be named nodes with an axis that may be operated like a joint. Nodes are conventionally used for character animations, hence the terminology of bones and skeleton. In FIG. 13, four bones 415 may be created: one at each point where the crossarm is connected to the vertical poles, and one at the base of each pole where it meets with the ground. An animation and timeline with steps may then be created, which may define the rotations applied to each node at every step or frame in the timeline. Different frames of the animation may represent degrees of lean to the "left" or "right" of the structure.

In an embodiment, in FIGS. 16-19, a model of an H frame with keyframe animations is shown. This may be a physically accurate representation of what a leaning structure may look like. By stepping through the frames of the animation timeline, the structure may be caused to lean by specific degree increments. Said steps may be automated and used to generate infinite damage samples. In an embodiment, FIGS. 20-23 show lidar simulated on an animated model of an H frame, as well as the connected conductors. This may simulate both lean on the structure and the impact to conductors.

Figure 24:
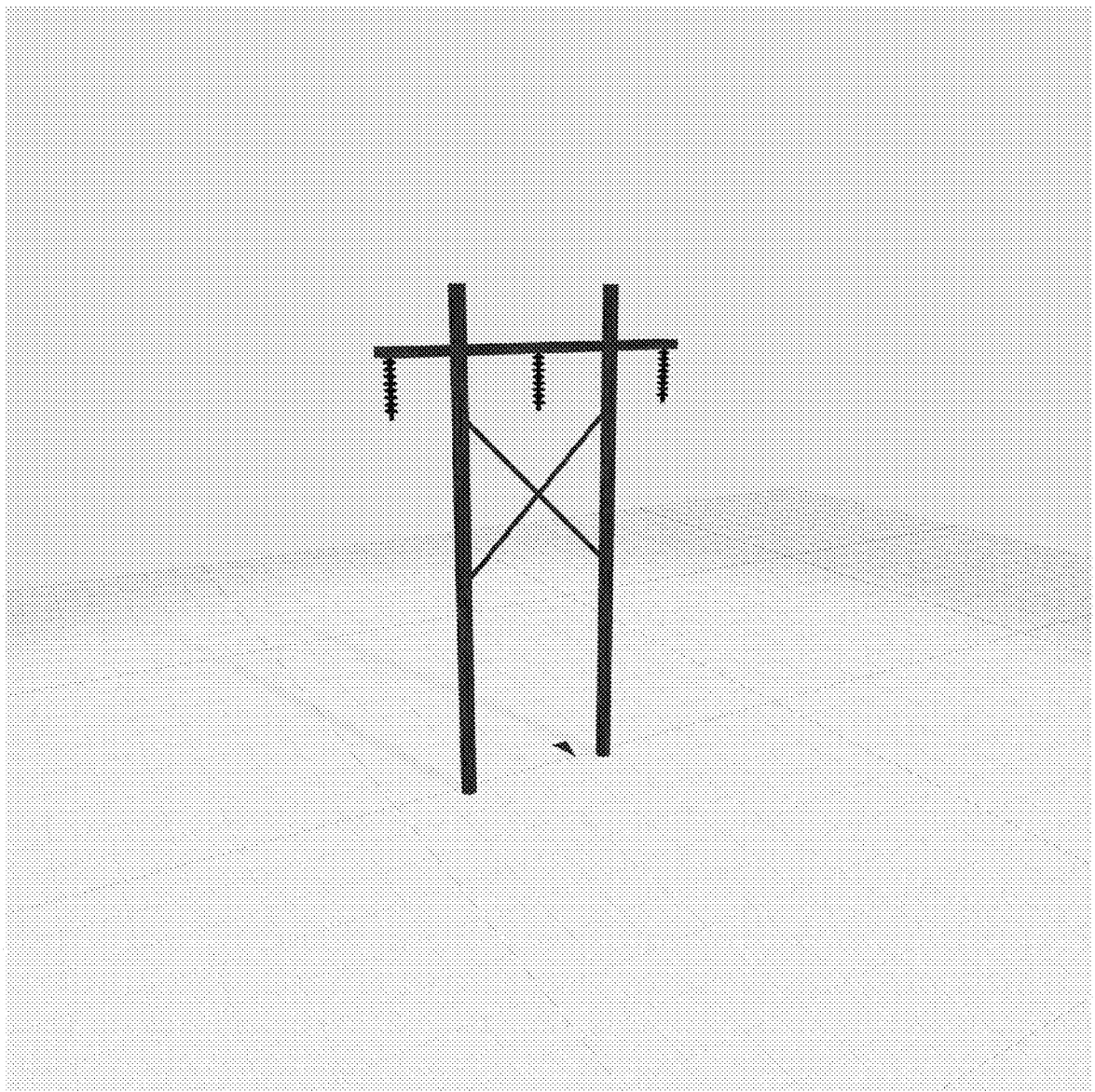
FIG. 24 is a simplified isolation view of a virtual asset model of an H frame transmission structure, in an embodiment.
Figure 25:
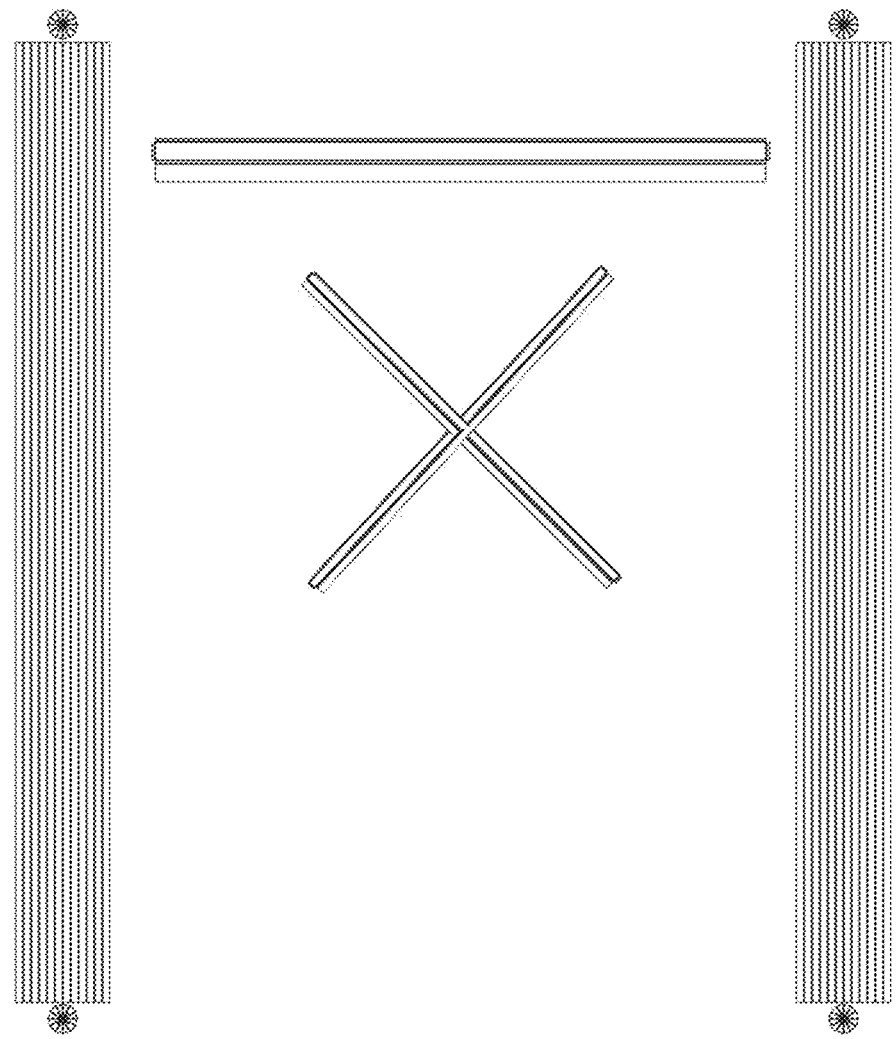
FIG. 25 is a simplified schematic two-dimensional representation of a surface mesh model corresponding to a three-dimensional virtual asset model of the H frame transmission structure shown generally in FIG. 24, in an embodiment.
Figure 26:
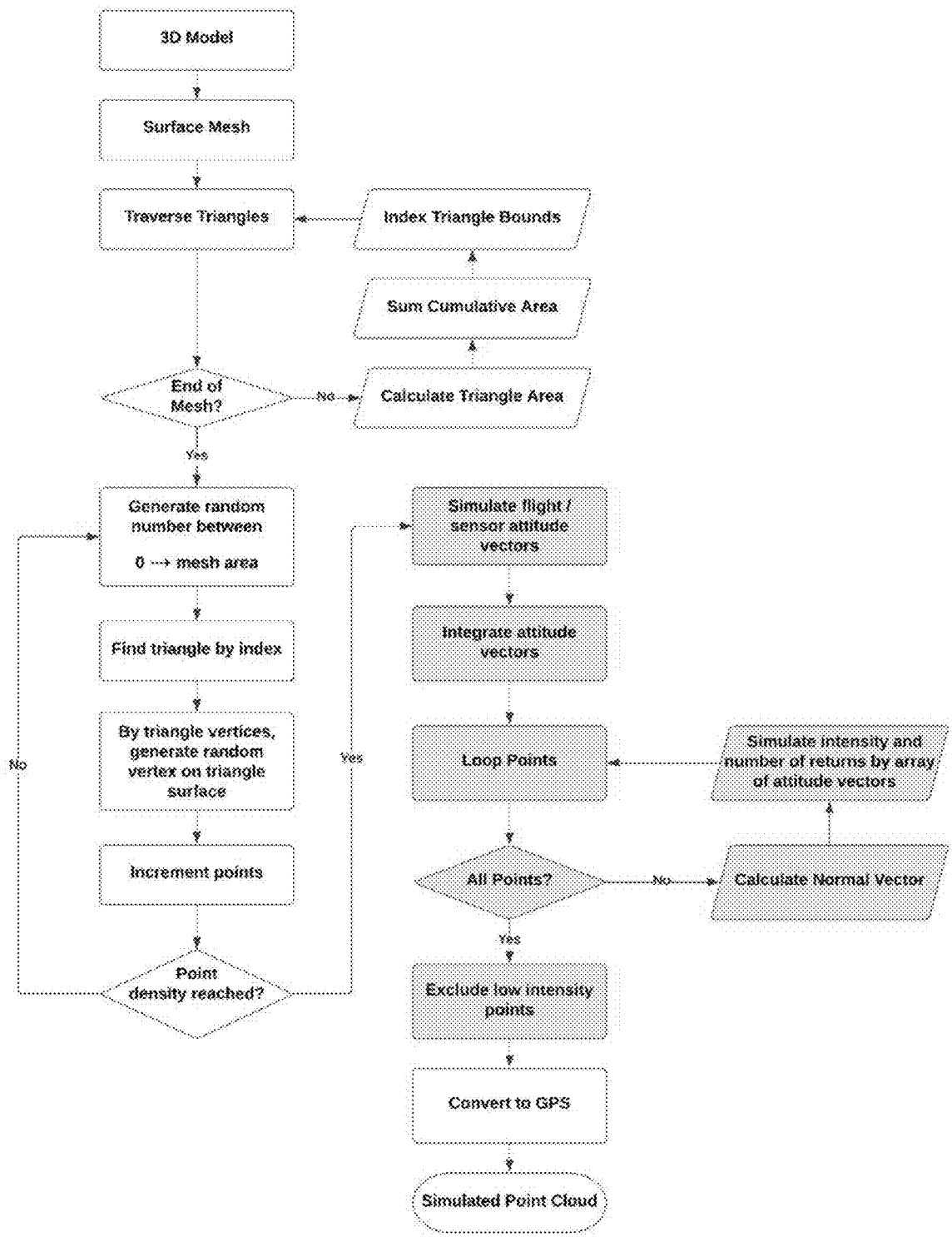
FIG. 26 is a simplified schematic view of a flow diagram illustrating a method 600 for generating a two-dimensional surface mesh model of external surfaces of a three-dimensional virtual asset model, in an exemplary embodiment.

In an embodiment, lidar point cloud data may be simulated on the models, as well as the conductor catenary. This may simulate what a lidar point cloud may look like in the real world if data were collected by a lidar sensor. In an embodiment, an algorithm may flatten the external surfaces of the three dimensional model onto a 2D plane. Points may then be randomly generated along the faces of all polygons, which then may be transformed to 3D coordinates and further transformed into earth/GPS coordinates. FIG. 24 shows a model of an H frame transmission structure. FIG. 25 visualizes what three dimensional surface polygons of an H frame may look like if flattened onto a two dimensional plane. This is a visual representation of a mathematical process. FIG. 26 illustrates a method 600 for generating a two-dimensional surface mesh model of external surfaces of a three-dimensional virtual asset model, in an exemplary embodiment.

The 3D model may be turned into a surface mesh which may then be traversed triangle-by-triangle. The area of each triangle may be calculated, along with the cumulative sum of all triangles, and then the position of each triangle may be indexed. A random number may then be generated between 0 and the total area of the mesh, which may then be used to locate a target triangle by the index previously created. A random vertex, or point, may then be generated on the surface of said triangle.

In an embodiment, subsequently, as an optional step when further simulating flight and sensor characteristics, the flight and sensor attitude vectors may be simulated. Attitude vectors across a flight trajectory may be integrated into a collection. Points may then be looped and compared to said collection, using the normal vector of an incident surface triangle to calculate an intensity value and number of returns. Said value may be used to exclude low value points, which may indicate they are on a "blind side" of a structure that lacks line of sight visibility with the lidar sensor.

For conductor simulation, the algorithm may be similar, but may operate along the path of a catenary line and its distance instead of triangle surfaces and mesh area. While the conductor may be three dimensional in physical space, its diameter may be relatively small and a line may be sufficient to model it.

Figure 27:
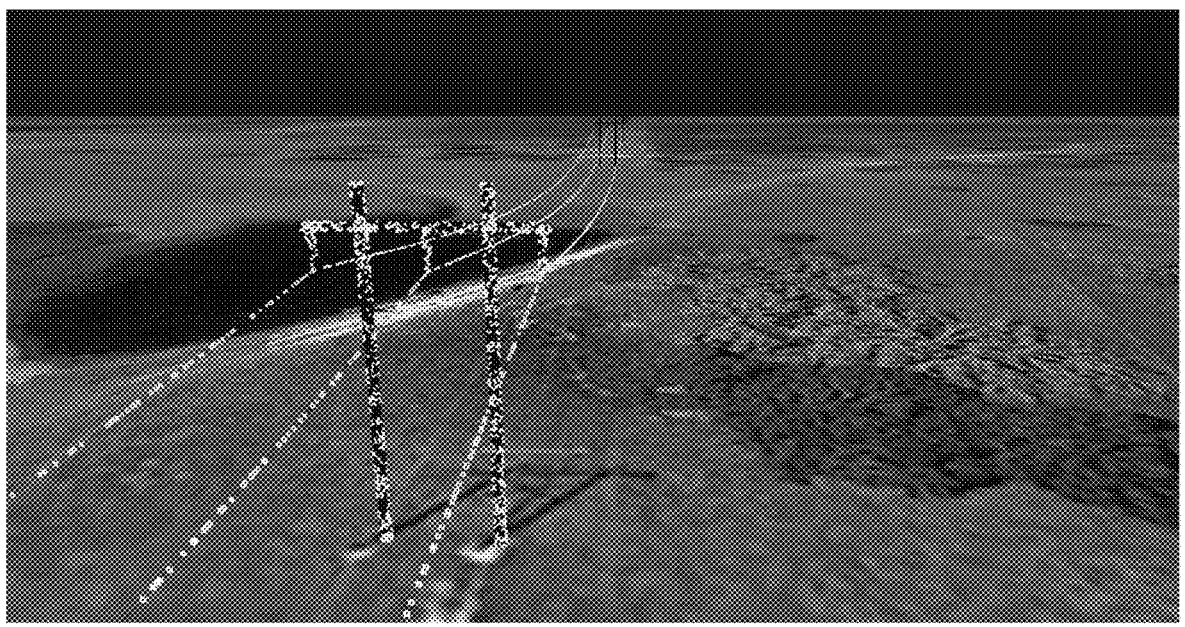
FIG. 27 is a simplified scene view of simulated lidar data point cloud of the virtual asset model of an H frame transmission structure and connected conductors, in an exemplary embodiment.
Figure 28:
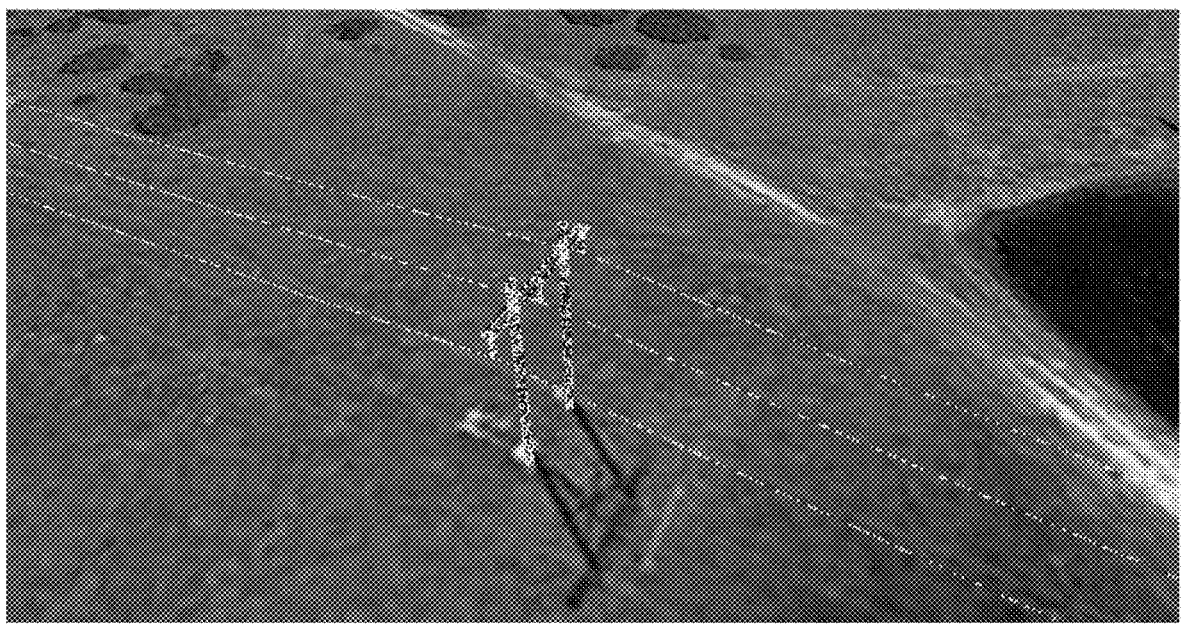
FIG. 28 is a simplified scene view of simulated lidar data point cloud of the virtual asset model of an H frame transmission structure and connected conductors, shown generally in FIG. 27.
Figure 29B:
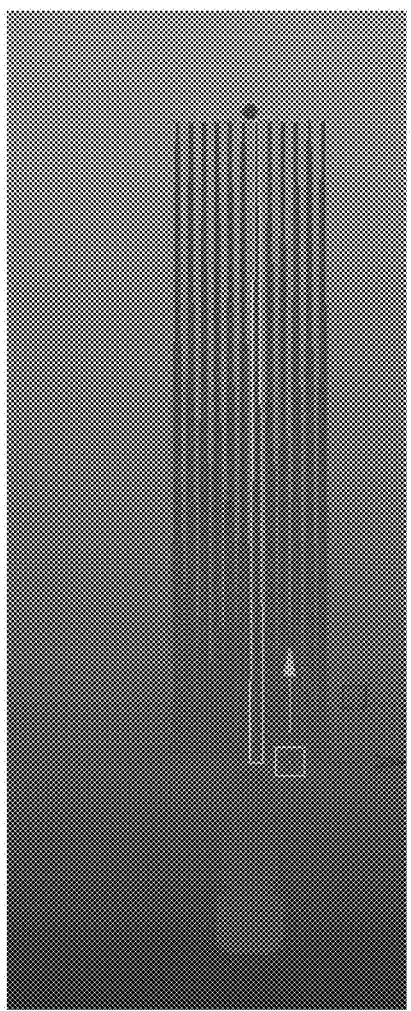
FIG. 29B is a simplified schematic two-dimensional representation of a surface mesh model corresponding to the three-dimensional virtual asset model of the metal monopole structure shown generally in FIG. 29A, in an embodiment.
Figure 29A:
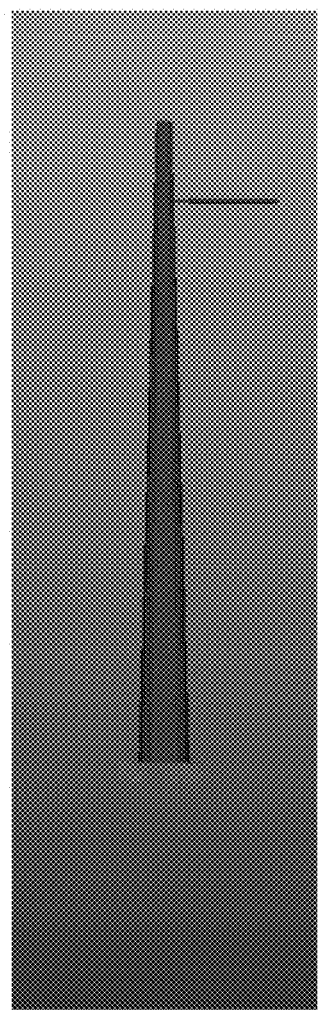
FIG. 29A is a simplified schematic three-dimensional virtual asset model of a metal monopole structure, in an embodiment.
Figure 30:
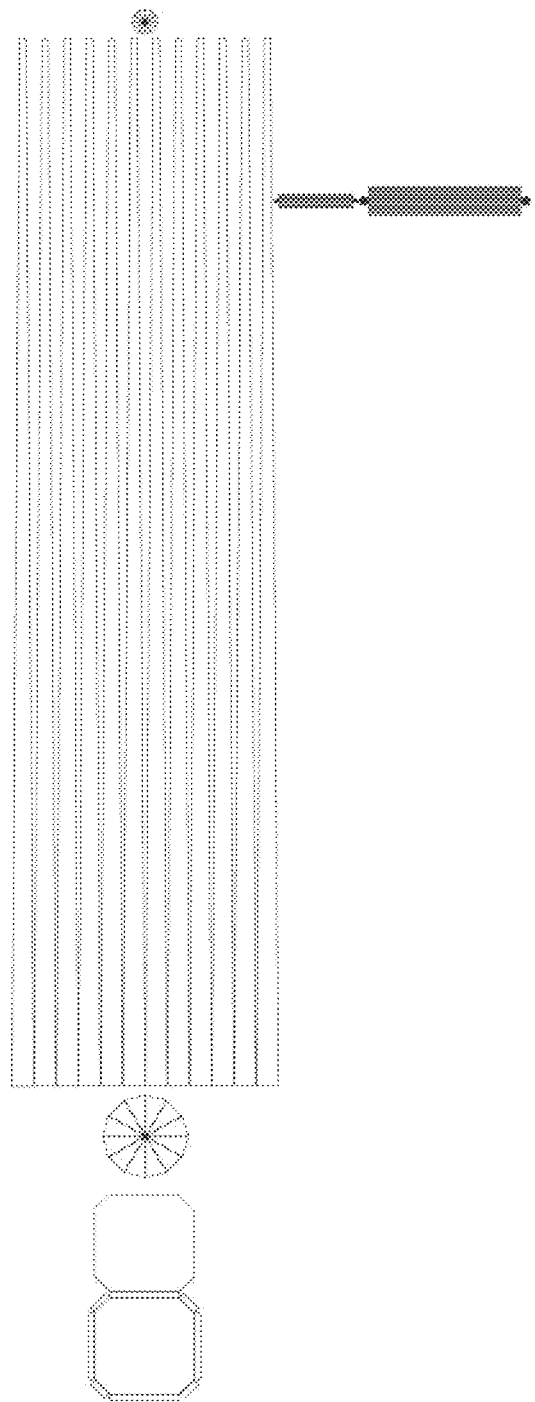
FIG. 30 is a simplified schematic two-dimensional representation of a surface mesh model corresponding to the three-dimensional virtual asset model of the metal monopole structure shown generally in FIG. 29A, in an embodiment.

In an embodiment, as shown in FIGS. 27 and 28, the end results may be lidar point clouds being simulated for the H frame and connected conductors. Said results may also be seen for other types of assets, such as monopole and lattice towers.

Said output results may be based on a roughly equal distribution of points which is not excluding "blind side" surface triangles. They may not take into account the attitude of a theoretical lidar sensor, which may be an optional step to the algorithm and lidar simulation as described previously.

In the real world a lidar sensor is a piece of hardware that operates by sending laser pulses and recording the reflections. Because of this, the laser pulses may not reach all sides of a structure. Imagine a flashlight for example. When pointed at some object, the sides facing the light will be illuminated, and the opposing sides will be dark and a shadow will be cast. Lidar sensors may be oriented in a variety of ways. Nadir, facing straight down from a flight vehicle, may result in a less even distribution of points that favors surfaces with a view of the sky. Or oblique, where the sensor is placed at an angle, forward or aft, in order to better paint the sides of structures. Two sensors may be operated in parallel, one facing forward and the other facing aft, so that structures are painted on both sides. One side on approach and the other side on departure, resulting in a very good distribution of points on all sides.

In an embodiment, as described, the algorithm may be tuned with parameters to mimic specific lidar sensor configurations and flight characteristics. This may allow lidar to be simulated based on specific flight vehicles, flight speeds and altitudes, specific lidar sensors and their characteristics such as frequency and point density.

Apparatus, methods and systems according to embodiments of the disclosure are described. Although specific embodiments are illustrated and described herein, it will be appreciated by those of ordinary skill in the art that any arrangement which is calculated to achieve the same purposes can be substituted for the specific embodiments shown. This application is intended to cover any adaptations or variations of the embodiments and disclosure. For example, although described in terminology and terms common to the field of art, exemplary embodiments, systems, methods and apparatus described herein, one of ordinary skill in the art will appreciate that implementations can be made for other fields of art, systems, apparatus or methods that provide the required functions. The invention should therefore not be limited by the above-described embodiments, methods, and examples, but by all embodiments and methods within the scope and spirit of the invention.

In particular, one of ordinary skill in the art will readily appreciate that the names of the methods and apparatus are not intended to limit embodiments or the disclosure. Furthermore, additional methods, steps, and apparatus can be added to the components, functions can be rearranged among the components, and new components to correspond to future enhancements and physical devices used in embodiments can be introduced without departing from the scope of embodiments and the disclosure. One of skill in the art will readily recognize that embodiments are applicable to future systems, future apparatus, future methods, and different materials.

All methods described herein can be performed in a suitable order unless otherwise indicated herein or otherwise clearly contradicted by context. The use of any and all examples, or exemplary language (e.g., "such as"), is intended merely to better illustrate the disclosure and does not pose a limitation on the scope of the disclosure unless otherwise claimed. No language in the specification should be construed as indicating any non-claimed element as essential to the practice of the disclosure as used herein. Terminology used in the present disclosure is intended to include all environments and alternate technologies that provide the same functionality described herein.

What is claimed is:

1. A computer-implemented method for performing automated damage assessment of electric grid infrastructure for post-storm recovery, said method comprising:
    providing, to at least one processor, a virtual model system including a three-dimensional (3D) virtual model of physical grid infrastructure, the physical grid infrastructure including a plurality of physical assets, the virtual model system including a plurality of virtual asset models corresponding to the plurality of physical assets;
    providing, to the at least one processor, a lidar imaging data point cloud collected from lidar imaging of a physical asset to characterize the physical asset in undamaged condition or damaged condition;
    performing, by the at least one processor, an automated damage assessment algorithm, the automated damage assessment algorithm further comprising;
        a simulation algorithm to be performed with the virtual model system, the simulation algorithm including:
            a damage simulation, and
            a lidar imaging data simulation; and
    performing, by the at least one processor, a classifier with a collected lidar imaging data point cloud to identify a damaged or undamaged condition of the physical asset.

2. The computer-implemented method according to claim 1, further comprising:
    wherein the virtual model system includes integrated physical grid data further including geographic information of the physical grid infrastructure and network topology information of the physical grid infrastructure.

3. The computer-implemented method according to claim 2, further comprising:
    wherein the three-dimensional (3D) virtual model of the physical grid infrastructure is generated from the integrated physical grid data.

4. The computer-implemented method according to claim 1, further comprising:
    wherein the damage simulation includes an asset condition module to simulate undamaged condition of an asset in an undamaged condition mode or damaged condition of an asset in a damaged condition mode.

5. The computer-implemented method according to claim 4, further comprising:
    wherein the asset condition module in the damaged condition mode simulates any of the following:

(i) simulated damage generated by automated manipulation of a virtual asset model generated programmatically;

(ii) simulated damage generated by manual manipulation of a first set of grouped points in a first lidar data point cloud, where the first lidar data point cloud includes real lidar data collected from imaging the physical asset;

(iii) simulated damage generated by manual manipulation of a second set of grouped points in a second lidar data point cloud, where the second lidar data point cloud includes simulated lidar data created by simulated imaging of the virtual asset model in the virtual model system;

(iv) simulated damage generated by automated manipulations of a third set of grouped points in a third lidar data point cloud, where the third set of grouped points are automatically selected and grouped, and where the third lidar data point cloud includes real lidar data collected from imaging the physical asset;

(v) simulated damage generated by automated manipulations of a fourth set of grouped points in a fourth lidar data point cloud, where the fourth set of grouped points are automatically selected and grouped, and where the fourth lidar data point cloud includes simulated lidar data created by simulated imaging of the virtual asset model in the virtual model system;

(vi) simulated damage generated by manual creation of a fixed virtual asset model, where the fixed virtual asset model embodies selected hypothetical damage of a particular physical asset represented by the fixed virtual asset model; and (vii) simulated damage generated by automated manipulation of a particular virtual asset model in predetermined ways, where the particular virtual asset model in three-dimensions includes keyframe animations allowing manipulation of the particular virtual asset model in the predetermined ways.

6. The computer-implemented method according to claim 1, further comprising:
wherein the lidar imaging data simulation includes a simulated lidar data point cloud for a virtual asset model corresponding to the physical asset.

7. The computer-implemented method according to claim 1, further comprising:
wherein the lidar imaging data simulation includes a flight vehicle simulation executable to simulate any of the following:
lidar sensor travel as carried on the simulated flight vehicle,
lidar sensor attitude in relation to the simulated flight vehicle,
lidar sensor attitude in relation to a simulated grid infrastructure as carried on the simulated flight vehicle, and
particular data collection properties of a lidar sensor.

8. The computer-implemented method according to claim 1, further comprising:
wherein the lidar imaging data simulation further comprises:
generating simulated lidar imaging data by simulating collection of lidar imaging data by a lidar sensor carried on a flight vehicle,
generating simulated travel of a virtual model flight vehicle along the physical grid infrastructure by simulating travel of the virtual model flight vehicle in relation to the virtual model system of the physical grid infrastructure, the virtual model flight vehicle carrying the lidar sensor to travel along the physical grid infrastructure.

9. The computer-implemented method according to claim 1, further comprising:
wherein field collected lidar imaging data of assets is processed to extract features of assets from raw field collected lidar imaging data to enable identification of assets by locations determined from global positioning system (GPS) data.

10. The computer-implemented method according to claim 1, further comprising:
wherein the classifier includes a trained classification model to use the collected lidar imaging data point cloud to identify a damaged or undamaged condition of an asset.

11. The computer-implemented method according to claim 10, further comprising:
wherein the trained classification model includes a machine learning algorithm.

12. The computer-implemented method according to claim 10, further comprising:
wherein the trained classification model accesses a machine learning algorithm.

13. The computer-implemented method according to claim 10, further comprising:
wherein the trained classification model includes an artificial intelligence algorithm.

14. The computer-implemented method according to claim 10, further comprising:
wherein the trained classification model accesses an artificial intelligence algorithm.

15. The computer-implemented method according to claim 10, further comprising:
wherein the trained classification model is trained by processing field collected lidar imaging data of a plurality of assets, simulated collected lidar imaging data of a plurality of assets, or both.

16. The computer-implemented method according to claim 10, further comprising:
wherein a plurality of assets includes both damaged assets and undamaged assets, and
wherein conditions of the plurality of assets are identified for training the trained classification model.

17. The computer-implemented method according to claim 1, further comprising:
wherein the performing the automated damage assessment enables expedited assignment of assets in the post-storm recovery.

18. A computer-implemented system comprising:
a processor; and
a memory storing instructions accessible by the processor to be configured to perform the method of claim 1.

19. A non-transitory computer-accessible medium having stored thereon computer-executable instructions for automated damage assessment of electric utility grid infrastructure, wherein, when a computer hardware arrangement executes the computer-executable instructions, the computer hardware arrangement is configured to perform procedures comprising the method of claim 1.

* * * * *